United States Patent
Nakabayashi et al.

(10) Patent No.: US 8,937,608 B2
(45) Date of Patent: Jan. 20, 2015

(54) TOUCH PANEL SYSTEM, ELECTRONIC INFORMATION DEVICE, AND METHOD FOR DETECTING INDICATOR POSITION

(75) Inventors: Tamiyo Nakabayashi, Osaka (JP); Shinichi Yoshida, Osaka (JP); Shunsuke Nagasawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 198 days.

(21) Appl. No.: 13/485,481

(22) Filed: May 31, 2012

(65) Prior Publication Data

US 2013/0285974 A1 Oct. 31, 2013

(30) Foreign Application Priority Data

Apr. 26, 2012 (JP) ................................ 2012-101538
May 25, 2012 (JP) ................................ 2012-120007

(51) Int. Cl.
*G06F 3/044* (2006.01)

(52) U.S. Cl.
USPC ........................................................ 345/174

(58) Field of Classification Search
CPC ..... G06F 3/041; G06F 3/0412; G06F 3/0416; G06F 3/0418; G06F 3/044; G06F 3/0487–3/04886; G06F 3/2203; G06F 3/04106; G06F 3/04111; G06F 3/04112
USPC ..................... 178/18.01, 18.03, 18.05, 18.06; 345/156, 173, 174
See application file for complete search history.

(56) References Cited

U.S. PATENT DOCUMENTS

| | | | |
|---|---|---|---|
| 2011/0084936 A1* | 4/2011 | Chang et al. | 345/174 |
| 2011/0122087 A1* | 5/2011 | Jang et al. | 345/174 |
| 2011/0157066 A1 | 6/2011 | Waterbury | |
| 2011/0234523 A1* | 9/2011 | Chang et al. | 345/173 |
| 2012/0013555 A1 | 1/2012 | Maeda et al. | |
| 2012/0182255 A1* | 7/2012 | Kuang et al. | 345/174 |

FOREIGN PATENT DOCUMENTS

| | | |
|---|---|---|
| JP | 2011-138469 A | 7/2011 |
| JP | 2012-22543 A | 2/2012 |
| JP | 2012-22635 A | 2/2012 |

OTHER PUBLICATIONS

Hattori, "Trend Analysis of In-cell/on-cell Type Touch Panel Technology," Front Line of Touch panel, Japan Nikkei Business Publications, Inc. Sep. 10, 2010, pp. 116-125 with partial English translation.

\* cited by examiner

*Primary Examiner* — Nathan Danielsen

(74) *Attorney, Agent, or Firm* — Birch Stewart Kolasch & Birch, LLP

(57) ABSTRACT

A touch panel system can accurately detect a position of an indicator as distinguished from noise, an electronic information device, and an indicator position detecting method are provided. An indicator position detecting portion detects a position of an indicator, which is in contact with or close to a detecting surface P, based on either one of a first or a second capacitance signal. The first capacitance signal is obtained in a first driving mode in which a first drive signal is applied to first signal lines and a first sense signal appearing on second signal lines is applied to a sense signal processing portion. The second capacitance signal is obtained in a second driving mode in which a second drive signal is applied to the second signal lines, and a second sense signal appearing on the first signal lines is applied to the sense signal processing portion.

14 Claims, 16 Drawing Sheets

TOUCH PANEL SYSTEM, ELECTRONIC INFORMATION DEVICE, AND METHOD FOR DETECTING INDICATOR POSITION

CROSS REFERENCE TO RELATED APPLICATION

This Nonprovisional application claims priority under 35 U.S.C. §119(a) on Patent Applications No. 2012-101538 filed in Japan on Apr. 26, 2012 and No. 2012-120007 filed in Japan on May 25, 2012 the entire contents of which are hereby incorporated by reference.

BACKGROUND OF THE INVENTION

1. Field of the Invention

The present invention relates to a touch panel system provided with a projection type touch panel system using an electrostatic capacitance system, an electronic information device provided with the touch panel system, and a method for detecting an indicator position by use of the touch panel.

2. Description of the Related Art

In recent years, a touch panel system for detecting a position of an indicator (for example, a finger of a user, or a touch pen; the same shall apply hereinafter) that is in contact with or close to a detecting surface of a touch panel to accept an instruction of the user is often provided on an electronic information device such as a portable telephone or a display apparatus. Especially, a projection type touch panel using an electrostatic capacitance system, which enables a multi-touch, has often been mounted on an electronic information device.

The projection type touch panel system using the electrostatic capacitance system includes a touch panel having a plurality of drive lines provided along a detecting surface so as to be parallel to each other, and a plurality of sense lines provided along the detecting surface so as to be parallel to each other and so as to cross the drive lines. In the touch panel system described above, when an electric signal (hereinafter referred to as a drive signal) is applied to the drive lines, an electric signal (hereinafter referred to as a sense signal) according to a capacity formed by the drive lines and the sense lines is generated on the sense lines. When this sense lines are acquired and processed, an in-plane distribution of the capacity can be obtained. A region where the capacitance is reduced due to an indicator being in contact with or close to the detecting surface is detected from the obtained in-plane distribution of the capacitance. The position of the indicator that is in contact with or close to the detecting surface is detected based on this region.

In the touch panel system described above, even if there are a plurality of indicators on the detecting surface, the position of each indicator can be detected only by detecting the region where the capacitance is reduced based on the obtained in-plane distribution of the capacitance. However, when a finger is in contact with the detecting surface, for example, noise might be caused along the sense lines on the region where the finger is in contact, in the obtained in-plane distribution of the capacitance, resulting in that a detection accuracy of the indicator might be deteriorated. This becomes a problem.

When a plurality of users simultaneously operate the touch panel (especially, when a plurality of users operate the touch panel by using different indicators), such as when a touch panel system is applied to a large-sized display device, for example, the problem caused by the deterioration in the detection accuracy of the indicator due to the noise becomes noticeable.

The specific example of this problem will be described with reference to the drawings. FIG. 11 is a graph illustrating an in-plane distribution of a capacitance obtained when a finger is in contact with a detecting surface in a conventional touch panel system. FIG. 12 is a graph illustrating an in-plane distribution of a capacitance obtained when a finger and a touch pen are in contact with the detecting surface in the conventional touch panel system. The lower graph in FIG. 11 illustrates the enlarged upper graph in FIG. 11. Similarly, the lower graph in FIG. 12 illustrates the enlarged upper graph in FIG. 12. The graphs in FIGS. 11 and 12 illustrate that a capacitance of a region where no object is present on the detecting surface is defined as a reference, and a region having a capacitance smaller than the reference capacitance projects upward.

As illustrated in FIG. 11, when a finger is in contact with the detecting surface, the capacitance of the region where the finger is in contact is decreased. However, noise is caused along the sense lines passing through the region where the finger is in contact in the obtained in-plane distribution of the capacitance.

In FIG. 11, the noise is sufficiently smaller than the decrease amount of the capacitance of the region where the finger is in contact. Therefore, in FIG. 11, the position where the finger is in contact can be detected in distinction from the noise.

On the other hand, as illustrated in FIG. 12, the decrease amount of the capacitance in the region where the touch pen is in contact is smaller than the decrease amount of the capacitance in the region where the finger is in contact. The noise can be larger than the decrease amount of the capacitance in the region where the touch pen is in contact. This is because a tip end of the touch pen is made narrow (e.g., about 1 mm to 4 mm) in order to enhance usability of the touch pen. Accordingly, when the touch pen is in contact with the sense lines passing through the region where the finger is in contact as illustrated in FIG. 12, it is difficult to distinguish the decrease amount of the capacitance in the region where the touch pen is in contact from the noise, because the decrease amount of the capacitance is buried in the noise. Therefore, the accuracy in detecting the position where the touch pen is in contact is deteriorated.

Japanese Laid-Open Patent Publication No. 2012-22543 discloses a touch panel system that detects positions of a plurality of indicators (electronic pen or finger) that are in contact with a detecting surface. The touch panel system recognizes an identification signal outputted from the electronic pen, thereby identifying the electronic pen, and detecting the position where this electronic pen is in contact.

The touch panel system described in Japanese Laid-Open Patent Publication No. 2012-22543 can use only a special electronic pen, which provides poor usability. Accordingly, a touch panel system has been desired that can accurately detect a position of an arbitrary indicator, which is not limited to the special indicator described above, in distinction from noise.

SUMMARY OF THE INVENTION

In view of the above-mentioned circumstances, the present invention provides a touch panel system that can accurately detect a position of an indicator in distinction from noise, an electronic information device provided with the touch panel system, and a method for detecting an indicator position that can be used in the touch panel system.

In order to attain the foregoing object, the present invention provides a touch panel system including: a touch panel including a plurality of first signal lines provided along a detecting surface so as to be parallel to each other, and a plurality of second signal lines provided along the detecting surface so as to be parallel to each other, the second signal lines crossing the first signal lines; a driving portion configured to apply a first drive signal to the first signal lines for driving the same in a first driving mode, and to apply a second drive signal to the second signal lines for driving the same in a second driving mode; a sense signal processing portion configured to generate a first capacitance signal indicating an in-plane distribution of a change in a capacitance formed by the first signal lines and the second signal lines, based on a first sense signal appearing on the second signal lines in the first driving mode, and to generate a second capacitance signal indicating an in-plane distribution of a change in a capacitance formed by the first signal lines and the second signal lines, based on a second sense signal appearing on the first signal lines in the second driving mode; a drive/sense changeover portion configured to make a changeover between the first driving mode and the second driving mode; and an indicator position detecting portion configured to detect a position of an indicator, which is in contact with or close to the detecting surface, based on at least either one of the first capacitance signal and the second capacitance signal.

In the touch panel system described above, it is preferable that the indicator position detecting portion detects the position of the indicator, which is in contact with or close to the detecting surface, by comparing the first capacitance signal with the second capacitance signal.

The touch panel system described above can distinguish the indicator from the noise by comparing the first capacitance signal with the second capacitance signal.

In the touch panel system described above, it is preferable that the indicator position detecting portion detects, as the position of the indicator that is in contact with or close to the detecting surface, a position where a change in the capacitance that is the same as that when the indicator is in contact with or close to the detecting surface appears in both the first capacitance signal and the second capacitance signal.

The touch panel system described above can detect the position having high possibility that the change of the capacitance caused by the indicator appears, as the position of the indicator.

In the touch panel system described above, it is preferable that the indicator position detecting portion detects the position of the indicator, which is in contact with or close to the detecting surface, based on a situation in which the first capacitance signal includes a first noise generated along the second signal lines passing through the position where the indicator is in contact with or close to the detecting surface, and a situation in which the second capacitance signal includes a second noise generated along the first signal lines passing through the position where the indicator is in contact with or close to the detecting surface.

The touch panel system described above can detect the position of the indicator by distinguishing the change in the capacitance caused by the indicator from the change in the capacitance caused by the first noise or the second noise.

In the touch panel system described above, it is preferable that the indicator position detecting portion does not detect a position where a change in the capacitance that is the same as that when the indicator is in contact with or close to the detecting surface appears in only either one of the first capacitance signal and the second capacitance signal, as the position of the indicator that is in contact with or close to the detecting surface.

The touch panel system described above is configured not to detect the position having high possibility that the first noise or the second noise appears, as the position of the indicator.

The touch panel system described above may use a first indicator and a second indicator as the indicator, wherein the magnitude of the first noise or the second noise generated when the first indicator is in contact with or close to the detecting surface may be larger than the amount of change of the capacitance when the second indicator is in contact with or close to the detecting surface.

The touch panel system described above can accurately detect the second indicator in distinction from the first noise or the second noise, wherein the amount of change of the capacitance generated when the second indicator is in contact with or close to the detecting surface can be indistinguishable from the first noise or the second noise generated when the first indicator is in contact with or close to the detecting surface. The first indicator may be a finger, and the second indicator may be a touch pen, for example.

In the touch panel system described above, it is preferable that, when the indicator position detecting portion determines that a first detection candidate position detected based on the first capacitance signal and a second detection candidate position detected based on the second capacitance signal agree with each other, it detects the position of the indicator by using at least either one of the first detection candidate position and the second detection candidate position.

The touch panel system described above can detect the position of the indicator by using the first detection candidate position and the second detection candidate position, when the first detection candidate position and the second detection candidate position are determined to agree with each other even if the changeover between the first driving mode and the second driving mode is executed, i.e., when the first detection candidate position and the second detection candidate position highly possibly indicate the position of the indicator.

In the touch panel system described above, it is preferable that the indicator position detecting portion is configured not to use the first detection candidate position and the second detection candidate position, which are determined not to agree with each other, for the detection of the position of the indicator.

The touch panel system described above can prevent the noise from being erroneously recognized as the indicator.

In the touch panel system described above, it is preferable that the indicator position detecting portion determines that the first detection candidate position and the second detection candidate position agree with each other not only in case where the first detection candidate position and the second detection candidate position exactly agree with each other, but also in case where the first detection candidate position and the second detection candidate position are close to each other and are included within a range with a predetermined size.

According to the touch panel system described above, even if the first detection candidate position and the second detection candidate position are slightly shifted from each other due to an error or the like, the indicator position detecting portion can determine that the first detection candidate position and the second detection candidate position agree with each other. Accordingly, the touch panel system can prevent an omission of detection of the indicator.

In the touch panel system described above, it is preferable that, every time the drive/sense changeover portion makes the changeover between the first driving mode and the second driving mode, the indicator position detecting portion detects the position of the indicator, which is in contact with or close to the detecting surface, by using at least one first capacitance signal and at least one second capacitance signal obtained just before and just after the changeover.

According to the touch panel system described above, the number of times of detecting the indicator can be increased (doubled), and the time interval of detecting the indicator can be decreased (reduced to half), compared to the case where the position of the indicator is detected every time either predetermined one of the first capacitance signal and the second capacitance signal is obtained. Accordingly, time resolution of detecting an indicator can be enhanced without increasing an operation speed (frame rate) of the touch panel system, whereby the accuracy of detecting the position of the indicator can be enhanced.

In the touch panel system described above, it is preferable that the drive/sense changeover portion makes the changeover between the first driving mode and the second driving mode in order that at least one of the first capacitance signal and the second capacitance signal can be obtained a plurality of times in a row; and the indicator position detecting portion uses a first capacitance signal, which is obtained by averaging the first capacitance signals obtained a plurality of times in a row, upon detecting the position of the indicator that is in contact with or close to the detecting surface, when the first capacitance signal is obtained a plurality of times in a row, and uses a second capacitance signal, which is obtained by averaging the second capacitance signals obtained a plurality of times in a row, upon detecting the position of the indicator that is in contact with or close to the detecting surface, when the second capacitance signal is obtained a plurality of times in a row.

The touch panel system described above can selectively eliminate (reduce) the noise component without giving an influence to the component of the indicator, since the indicator position detecting portion averages the first capacitance signals and the second capacitance signals respectively. Even if the position of the indicator component in each of the first capacitance signal and the second capacitance signal is shifted from the real position of the indicator due to jitter, the influence caused by the jitter can be suppressed by the averaging process. Accordingly, the accuracy in detecting the position of the indicator can be enhanced.

In the touch panel system described above, it is preferable that, when the number of the first signal lines is larger than the number of the second signal lines, the number of the second capacitance signals obtained in a row is not more than the number of the first capacitance signals obtained in a row.

The touch panel system described above increases the number of the first capacitance signals generated in a row since each of the first capacitance signals is generated in a relatively short time, thereby enhancing the effect of the averaging process. On the other hand, the touch panel system described above decreases the number of the second capacitance signals generated in a row since it takes a relatively long time to generate each of the second capacitance signals, thereby shortening the processing time. Consequently, the accuracy in detecting the position of the indicator can be enhanced, and the processing time can be shortened.

In the touch panel system described above, it is preferable that the drive/sense changeover portion selectively executes one of a noise eliminating operation in which the changeover between the first driving mode and the second driving mode is performed, and a normal operation in which one of the first driving mode and the second driving mode is continued.

The touch panel system described above can selectively execute one of the noise eliminating operation and the normal operation according to a purpose of the touch panel system and the electronic information device provided with the touch panel system.

The present invention also provides an electronic information device provided with the touch panel system described above.

The present invention also provides an indicator position detecting method for detecting a position of an indicator that is in contact with or close to a detecting surface by using a touch panel including a plurality of first signal lines provided along the detecting surface so as to be parallel to each other, and a plurality of second signal lines provided along the detecting surface so as to be parallel to each other, the second signal lines crossing the first signal lines, the method comprising: a first driving mode executing step of applying a first drive signal to the first signal lines for driving the same, and acquiring and processing a first sense signal appearing on the second signal lines, in order to generate a first capacitance signal indicating an in-plane distribution of a change in a capacitance formed by the first signal lines and the second signal lines; a second driving mode executing step of applying a second drive signal to the second signal lines for driving the same, and acquiring and processing a second sense signal appearing on the first signal lines, in order to generate a second capacitance signal indicating an in-plane distribution of a change in a capacitance formed by the first signal lines and the second signal lines; and an indicator position detecting step of detecting the position of the indicator, which is in contact with or close to the detecting surface, through a comparison between the first capacitance signal and the second capacitance signal.

According to the indicator position detecting method described above, the influence of noise can be suppressed by the comparison between the first capacitance signal and the second capacitance signal.

In the indicator position detecting method described above, it is preferable that the intensity of the first drive signal and the intensity of the second drive signal are set to be equal to each other.

The indicator position detecting method described above enables the comparison between the first capacitance signal and the second capacitance signal, putting the states of them close to each other in the indicator position detecting step.

The touch panel system thus configured can distinguish an indicator from noise. Accordingly, the touch panel system can accurately detect the position of the indicator in distinction from the noise.

DETAILED DESCRIPTION OF THE INVENTION

<Touch Panel System>

Figure 1:
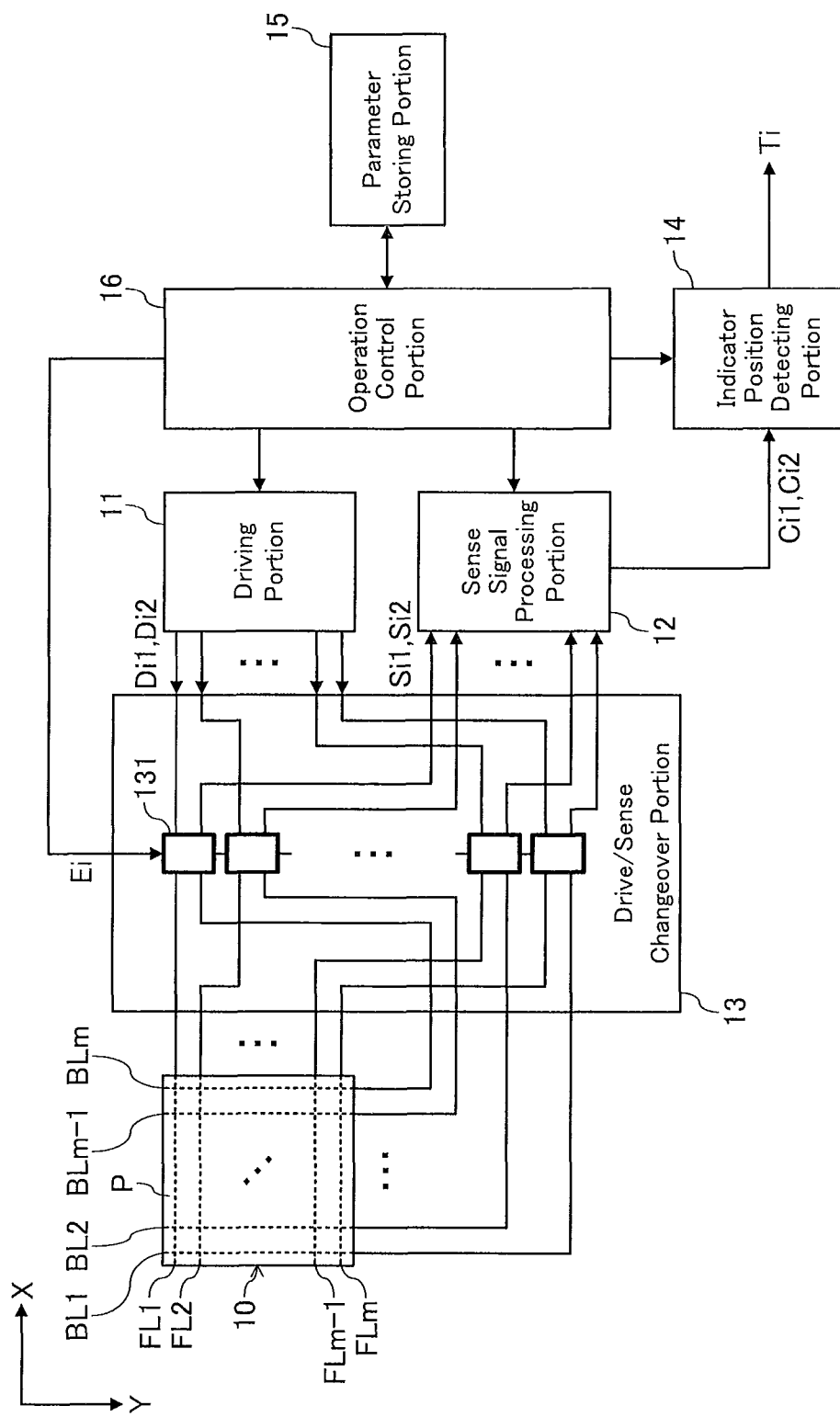
FIG. 1 is a block diagram illustrating an example of a configuration of a touch panel system according to an embodiment of the present invention.

A touch panel system according to an embodiment of the present invention will be described below with reference to the drawings. FIG. 1 is a block diagram illustrating an example of a configuration of a touch panel system according to an embodiment of the present invention.

As illustrated in FIG. 1, the touch panel system 1 includes a touch panel 10 having a plurality of first signal lines FL1 to FLm (in is a natural number of 2 or more) provided along a detecting surface P so as to be parallel to each other, and a plurality of second signal lines BL1 to BLm provided along the detecting surface P so as to be parallel to each other and so as to cross the first signal lines FL1 to FLm; a driving portion 11 that applies a first drive signal Di1 to the first signal lines FL1 to FLm for driving the same, or applies a second drive signal Di2 to the second signal lines BL1 to BLm for driving the same; a sense signal processing portion 12 that acquires and processes a first sense signal Si1 generated on the second signal lines BL1 to BLm by the drive of the first signal lines FL1 to FLm, or a second sense signal Si2 generated on the first signal lines FL1 to FLm by the drive of the second signal lines BL1 to BLm, thereby generating a first capacitance signal Ci1 or a second capacitance signal Ci2 that indicates an in-plane distribution of a change in a capacitance made by the first signal lines FL1 to FLm and the second signal lines BL1 to BLm; a drive/sense changeover portion 13 that controls the changeover of connection between the first signal lines FL1 to FLm as well as the second signal lines BL1 to BLm and the driving portion 11 as well as the sense signal processing portion 12; an indicator position detecting portion 14 that detects a position of an indicator, which is in contact with or close to the detecting surface P of the touch panel 10 based on at least either one of the first capacitance signal Ci1 and the second capacitance signal Ci2, and outputs a detection result signal Ti; a parameter storing portion 15 that stores various parameters, all or some of the parameters being changeable; and an operation control portion 16 that operates the driving portion 11, the sense signal processing portion 12, the drive/sense changeover portion 13, and the indicator position detecting portion 14 at a predetermined timing.

FIG. 1 illustrates that each of the first signal lines FL1 to FLm is provided to extend in an X direction (in the lateral direction in FIG. 1), while each of the second signal lines BL1 to BLm is provided to extend in a Y direction (in the vertical direction in FIG. 1). Specifically, FIG. 1 illustrates that each of the first signal lines FL1 to FLm and each of the second signal lines BL1 to BLm perpendicularly cross each other. Each of the first signal lines FL1 to FLm and each of the second signal lines BL1 to BLm may cross each other at an angle other than 90 degrees. FIG. 1 illustrates that the number of the first signal lines FL1 to FLm and the number of the second signal lines BL1 to BLm are both m. However, the numbers may naturally be different (this will be described later).

A capacitance is formed on the portion, where each of the first signal lines FL1 to FLm and each of the second signal lines BL1 to BLm cross each other, between the first signal lines FL1 to FLm and the second signal lines BL1 to BLm (such a capacitance is merely referred to as a capacitance hereinafter).

The driving portion 11 outputs the first drive signal Di1 and the second drive signal Di2, which change with a predetermined pattern, in accordance with the control by the operation control portion 16. When the first drive signal Di1 is applied to the first signal lines FL1 to FLm, a first sense signal Si1 that is an electric signal according to the capacitance is generated on the second signal lines BL1 to BLm. Similarly, when the second drive signal Di2 is applied to the second signal lines BL1 to BLm, a second sense signal Si2 that is an electric signal according to the capacitance is generated on the first signal lines FL1 to FLm. Which one of the case where the first drive signal Di1 is applied to the first signal lines FL1 to FLm, and the case where the second drive signal Di2 is applied to the second signal lines BL1 to BLm is set is determined by the operation of the drive/sense changeover portion 13 described later.

The sense signal processing portion 12 acquires the first sense signal Si1 generated on the second signal lines BL1 to BLm at the predetermined timing, performs a process such as an amplification and conversion, and decodes the resultant, thereby generating the first capacitance signal Ci1 indicating the in-plane distribution of the change in the capacitance, in accordance with the control by the operation control portion 16. The sense signal processing portion 12 also acquires the second sense signal Si2 generated on the first signal lines FL1 to FLm at the predetermined timing, performs a process such as an amplification and conversion, and decodes the resultant, thereby generating the second capacitance signal Ci2 indicating the in-plane distribution of the change in the capacitance. The first capacitance signal Ci1 and the second capacitance signal Ci2 may be signals indicating the in-plane distribution of the capacitance, or may be signals indicating a distribution of a difference in the capacitance (specifically, for example, when the first sense signal Si1 is generated on the second signal lines BL1 to BLm, the difference in the capacitance in the direction (X direction) in which the second signal lines BL1 to BLm are adjacent to each other, and when the second sense signal Si2 is generated on the first signal lines FL1 to FLm, the difference in the capacitance in the direction (Y direction) in which the first signal lines FL1 to FLm are adjacent to each other).

The drive/sense changeover portion 13 includes a plurality of (m in FIG. 1) connection changeover portions 131 that control the changeover of connection between one first signal line as well as one second signal line and the driving portion 11 as well as the sense signal processing portion 12. The connection changeover portions 131 are connected in serial, wherein a changeover control signal Ei is inputted sequentially from the first connection changeover portion 131 to the last connection changeover portion 131. The changeover control signal Ei is generated by the operation control portion 16, and it is inputted to the first connection changeover portion 131 from the operation control portion 16. The last connection changeover portion 131 ends the transmission without outputting the changeover control signal Ei to the others.

Figure 2:
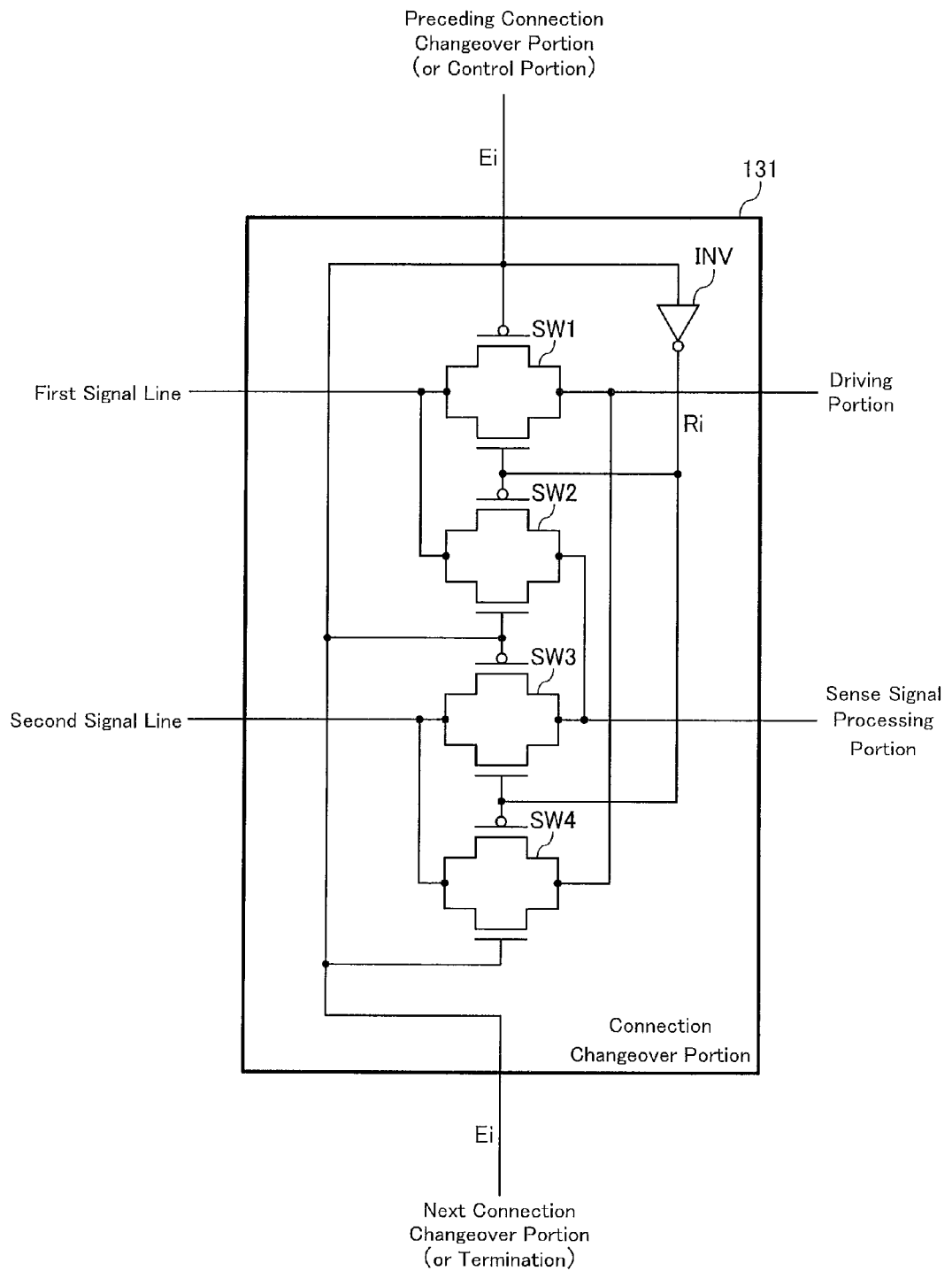
FIG. 2 is a block diagram illustrating an example of a configuration of one connection changeover portion provided to a drive/sense changeover portion in FIG. 1.

The specific configuration and operation of the connection changeover portion 131 will be described with reference to FIG. 2. FIG. 2 is a block diagram illustrating an example of the configuration of one connection changeover portion provided to the drive/sense changeover portion in FIG. 1.

As illustrated in FIG. 2, the connection changeover portion 131 includes four CMOS switches SW1 to SW4, and one inverter INV. One end of each of PMOS and NMOS of the CMOS switch SW1 is connected to the first signal line, while the other end is connected to the driving portion 11, wherein the changeover control signal Ei is inputted to a gate of the PMOS, and an inverted changeover control signal Ri, which is the changeover control signal inverted by the inverter INV, is inputted to a gate of the NMOS. One end of each of PMOS and NMOS of the CMOS switch SW2 is connected to the first signal line, while the other end is connected to the sense signal processing portion 12, wherein the inverted changeover control signal Ri is inputted to a gate of the PMOS, and the changeover control signal Ei is inputted to a gate of the NMOS. One end of each of PMOS and NMOS of the CMOS switch SW3 is connected to the second signal line, while the other end is connected to the sense signal processing portion 12, wherein the changeover control signal Ei is inputted to a gate of the PMOS, and the inverted changeover control signal Ri is inputted to a gate of the NMOS. One end of each of PMOS and NMOS of the CMOS switch SW4 is connected to the second signal line, while the other end is connected to the driving portion 11, wherein the inverted changeover control signal Ri is inputted to a gate of the PMOS, and the changeover control signal Ei is inputted to a gate of the NMOS.

When the changeover control signal Ei is in a low state, the CMOS switches SW1 and SW3 are turned on, while the CMOS switches SW2 and SW4 are turned off. Accordingly, the drive signal Di1 is applied to the first signal lines FL1 to FLm, whereby the first signal lines FL1 to FLm are driven, and the first sense signal SA generated on the second signal lines BL1 to BLm is applied to the sense signal processing portion 12. The operation state described above is referred to as a "first driving mode" below.

On the other hand, when the changeover control signal Ei is in a high state, the CMOS switches SW2 and SW4 are turned on, while the switches SW1 and SW3 are turned off. Accordingly, the second drive signal Di2 is applied to the second signal lines BL1 to BLm, whereby the second signal lines BL1 to BLm are driven, and the second sense signal Si2 generated on the first signal lines FL1 to FLm is applied to the sense signal processing portion 12. The operation state described above is referred to as a "second driving mode" below.

The touch panel system 1 executes a "noise eliminating operation" for making a changeover between the first driving mode and the second driving mode. With this operation, the touch panel system 1 can accurately detect a position of an indicator in distinction from noise.

Figure 3A:
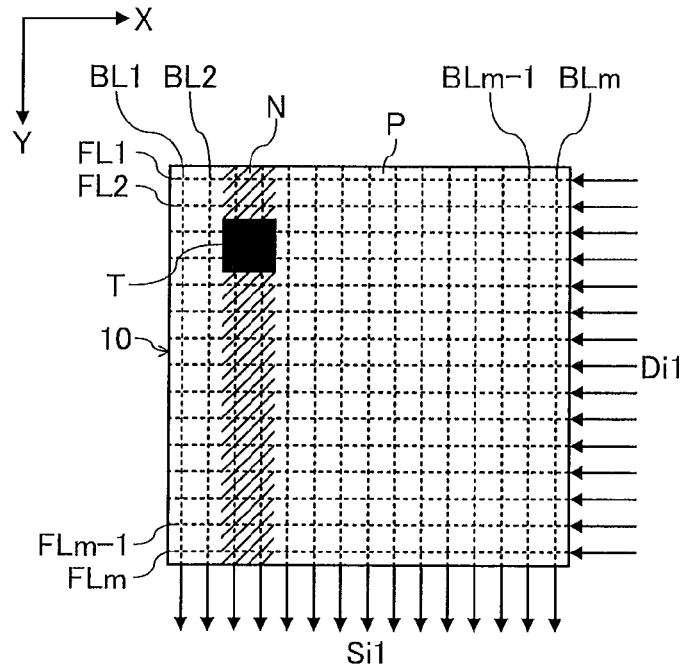
FIG. 3 is a view for describing a first driving mode and a second driving mode.
Figure 3B:
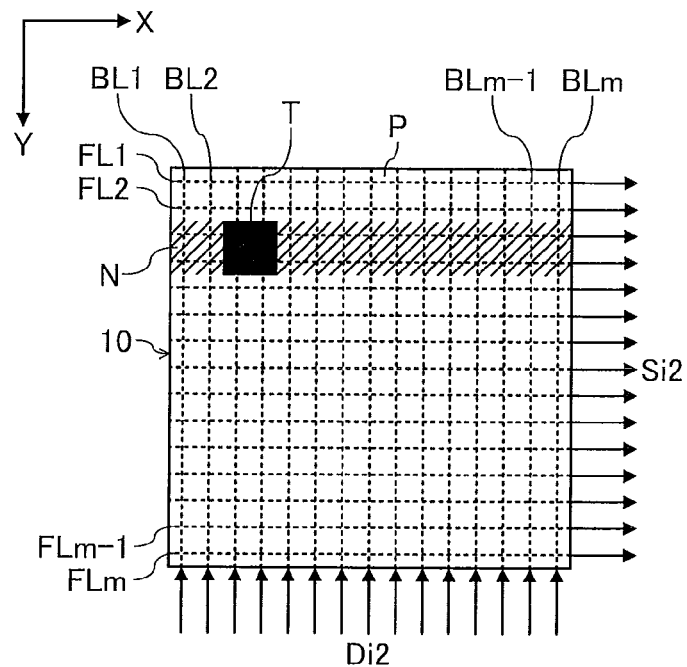

The first driving mode and the second driving mode will specifically be described respectively with reference to FIG. 3. FIG. 3 is a view for describing the first driving mode and the second driving mode. FIG. 3A is a view illustrating the first driving mode, while FIG. 3B is a view illustrating the second driving mode.

Figure 11:
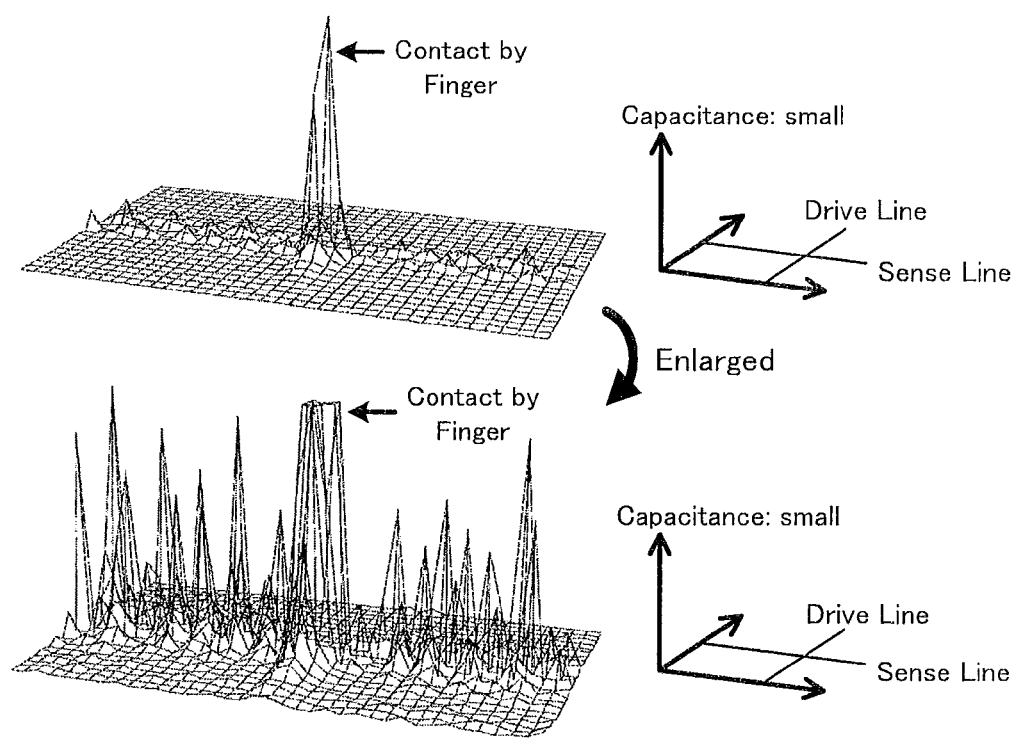
FIG. 11 is a graph illustrating an in-plane distribution of a capacitance obtained when a finger is in contact with a detecting surface in a conventional touch panel system.
Figure 12:
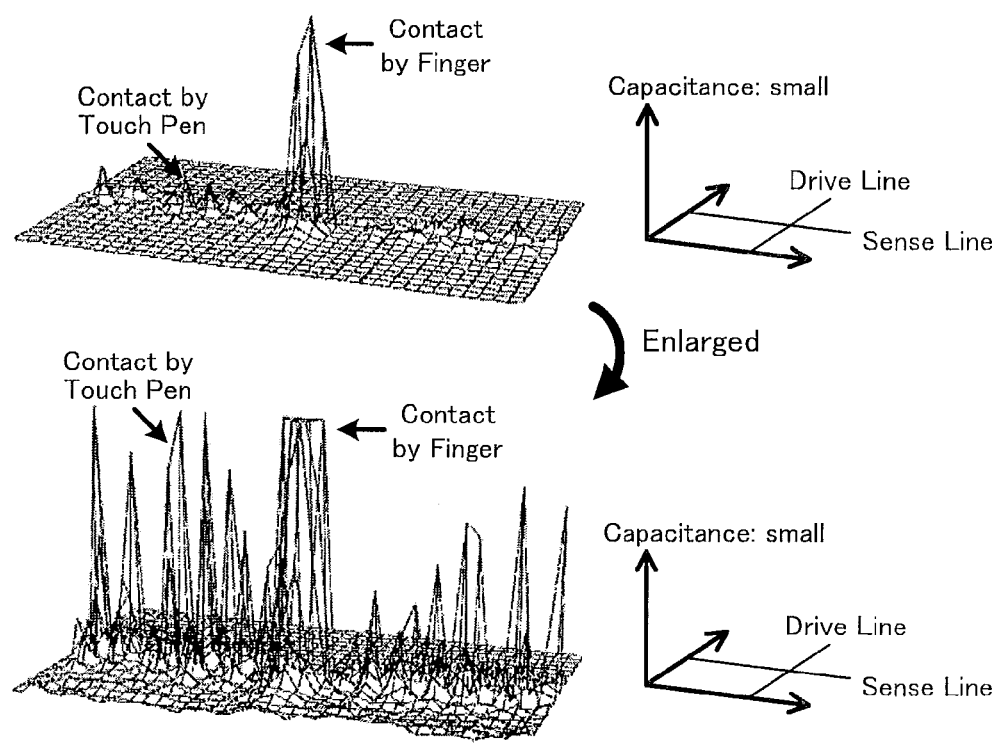
FIG. 12 is a graph illustrating an in-plane distribution of a capacitance obtained when a finger and a touch pen are in contact with the detecting surface in the conventional touch panel system.

As illustrated in FIG. 3A, the first drive signal Di1 is applied to the first signal lines FL1 to FLm for driving the same, and the first sense signal Si1 is generated on the second signal lines BL1 to BLm in the first driving mode. When an indicator (particularly, a finger) is in contact with the detecting surface P in this case, noise is caused in a noise generation region N, which is a region along the second signal lines passing through an indicator contact region T, in the first capacitance signal Ci1 generated by the sense signal processing portion 12 (see FIGS. 11 and 12).

On the other hand, as illustrated in FIG. 3B, the second drive signal Di2 is applied to the second signal lines BL1 to BLm for driving the same, and the second sense signal Si2 is generated on the first signal lines FL1 to FLm in the second driving mode. When the indicator (particularly, a finger) is in contact with the detecting surface P in this case, noise is caused in the noise generation region N, which is a region along the first signal lines passing through the indicator contact region T, in the second capacitance signal Ci2 generated by the sense signal processing portion 12 (see FIGS. 11 and 12).

In FIGS. 3A and 3B, the indicator contact regions T are the same, but the noise generation regions N are different from each other. Therefore, the drive/sense changeover portion 13 makes a changeover between the first driving mode and the second driving mode (executes the noise eliminating operation). With this operation, the indicator position detecting portion 14 compares the first capacitance signal Ci1 with the second capacitance signal Ci2, which are respectively obtained in the first driving mode and the second driving mode, thereby being capable of detecting the indicator contact region T in distinction from the noise region N.

In this case, when the intensity of the first drive signal Di1 applied to the first signal lines FL1 to FLm in the first driving mode, and the intensity of the second drive signal Di2 applied to the second signal lines BL1 to BLm in the second driving mode are set to be equal to each other, the first capacitance signal Ci1 and the second capacitance signal Ci2 can be made close to each other and compared. Therefore, this operation is preferable.

The indicator position detecting portion 14 detects a position of an indicator, which is in contact with or is close to the detecting surface P, based on at least either one of the first capacitance signal Ci1 and the second capacitance signal Ci2, thereby generating the detection result signal Ti, in accordance with the control by the operation control portion 16 as described above. The detection result signal Ti can include a number of the detected indicators, positions of the respective indicators, and a degree of contact or a degree of closeness (decrease amount of the capacitance) of each of the indicators to the detecting surface P. The detection result signal Ti is used as a signal indicating a user's instruction in an electronic information device provided with the touch panel system 1, for example.

Figure 4:
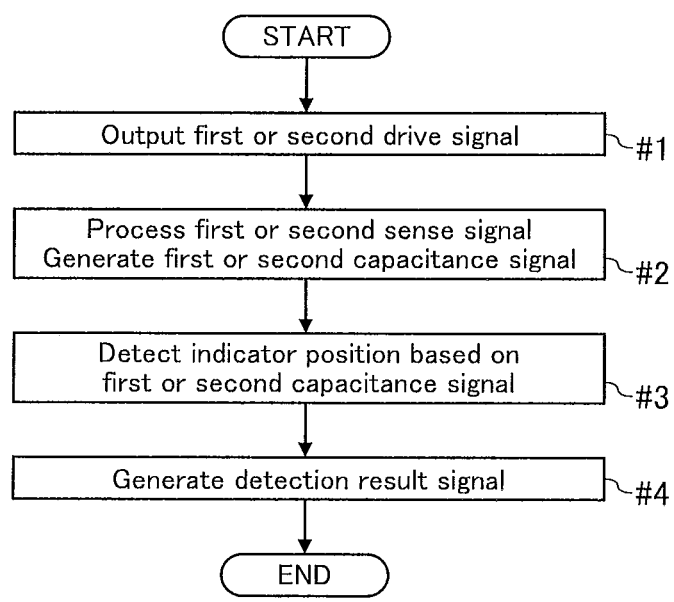
FIG. 4 is a flowchart illustrating an example of a normal operation of a touch panel system according to the embodiment of the present invention.
Figure 5:
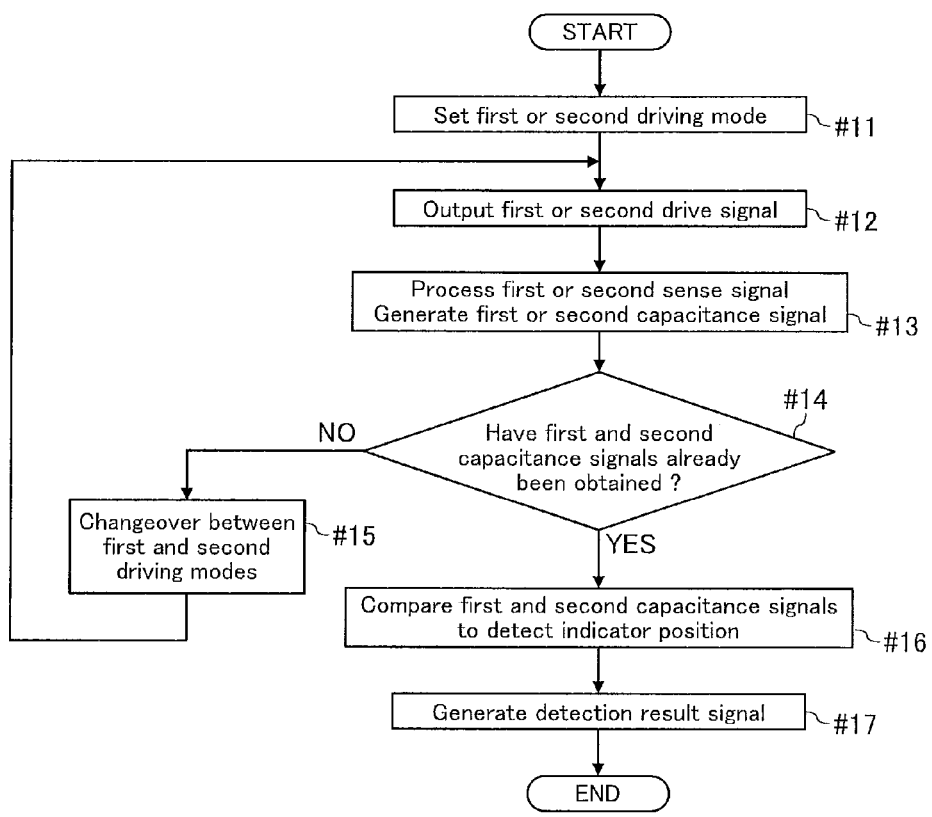
FIG. 5 is a flowchart illustrating an example of a noise eliminating operation of a touch panel system according to the embodiment of the present invention.

An example of an operation of the touch panel system 1 will next be described with reference to FIGS. 4 and 5. FIG. 4 is a flowchart illustrating an example of a normal operation of the touch panel system according to the embodiment of the present invention. FIG. 5 is a flowchart illustrating an example of the noise eliminating operation of the touch panel system according to the embodiment of the present invention.

FIGS. 4 and 5 illustrate the operation of detecting the indicator once. Therefore, when the touch panel system 1 continuously performs the noise eliminating operation or the normal operation, it repeatedly performs the operation illustrated in FIG. 4 or FIG. 5. The touch panel system 1 may perform the normal operation or the noise eliminating operation by the operation control portion 16 that controls the driving portion 11, the sense signal processing portion 12, the drive/sense changeover portion 13, and the indicator position detecting portion 14 by referring to the parameters, indicating the operation to be executed, stored in the parameter storing portion 15. When the touch panel system 1 is operated as described above, one of the noise eliminating operation and the normal operation can selectively be executed according to a purpose of the touch panel system 1 and the electronic information device provided with the touch panel system 1. Thus, such a operation of the touch panel system 1 is preferable.

As illustrated in FIG. 4, when the touch panel system 1 performs the normal operation, the driving portion 11 firstly outputs the first drive signal Di1 or the second drive signal Di2 (Step #1), and the sense signal processing portion 12 processes the first sense signal Si1 or the second sense signal Si2 so as to generate the first capacitance signal Ci1 or the second capacitance signal Ci2 (Step #2). When it is the first time to detect an indicator, the operation control portion 16 may input the changeover control signal Ei for changing the mode to the driving mode for an initialization by referring to a parameter, stored in the parameter storing portion 15, indicating the driving mode (first driving mode, or the second driving mode, the same shall apply hereinafter) for the initialization, in order to change the mode to a desired driving mode, before the execution of Step #1.

The indicator position detecting portion 14 detects the position of the indicator based on the first capacitance signal Ci1 or the second capacitance signal Ci2 obtained in Step #2 (Step #3). Then, the indicator position detecting portion 14 generates the detection result signal Ti indicating the position of the indicator detected in Step #3, and outputs the resultant (Step #4). When the indicator is not detected in Step #3, the indicator position detecting portion 14 may generate and output the detection result signal Ti indicating that there is no indicator that is in contact with or close to the detecting surface P. The indicator position detecting portion 14 may detect the position of the indicator from the first capacitance signal Ci1 or the second capacitance signal Ci2 by any methods in Step #3. Specifically, for example, the indicator position detecting portion 14 may detect the position of the indicator by detecting a region where a capacitance is locally decreased in the detecting surface P based on the first capacitance signal Ci1 or the second capacitance signal Ci2.

As described above, in the normal operation, the drive/sense changeover portion 13 continues one of the first driving mode and the second driving mode, and the indicator position detecting portion 14 detects the position of the indicator.

On the other hand, when the touch panel system 1 executes the noise eliminating operation, the drive/sense changeover portion 13 sets the driving mode at the beginning as illustrated in FIG. 5 (Step #11). When it is the first time to detect an indicator, for example, the operation control portion 16 inputs the changeover control signal Ei, which is for changing the mode to the driving mode for the initialization, to the drive/sense changeover portion 13 by referring to the parameter, which is stored in the parameter storing portion 15 and which indicates the driving mode of the initialization, thereby setting the driving mode. When it is the second and subsequent times to detect an indicator, the operation control portion 16 inputs the changeover control signal Ei, which is for changing the mode to a driving mode that is different from the last driving mode, to the drive/sense changeover portion 13, thereby setting the driving mode. With this operation, if the last driving mode is the first driving mode, the drive/sense changeover portion 13 changes the first driving mode to the second driving mode. If the last driving mode is the first driving mode, the drive/sense changeover portion 13 changes the first driving mode to the second driving mode.

Then, the driving portion 11 outputs the first drive signal Di1 or the second drive signal Di2 (Step #12), and the sense signal processing portion 12 processes the first sense signal Si1 or the second sense signal Si2 so as to generate the first capacitance signal Ci1 or the second capacitance signal Ci2 (Step #13).

When the first capacitance signal Ci1 and the second capacitance signal Ci2 have not yet been obtained (Step #14, NO), the drive/sense changeover portion 13 changes the mode to the first driving mode or the second driving mode (Step #15), and then, executes again the processes in Steps #12 and #13. The case where the first capacitance signal Ci1 and the second capacitance signal Ci2 have not yet been obtained at this point means that it is the first time to detect an indicator, and the processes in Steps #12 and #13 are executed only once. When it is the second or subsequent times to detect an indicator, the first capacitance signal Ci1 and the second capacitance signal Ci2 have already been obtained at this point.

When the first capacitance signal Ci1 and the second capacitance signal Ci2 have already been obtained (Step #14, YES), the indicator position detecting portion 14 detects the position of the indicator by comparing the first capacitance signal Ci1 with the second capacitance signal Ci2 (Step #16). In this case, the indicator position detecting portion 14 compares the first capacitance signal Ci1 or the second capacitance signal Ci2 obtained in the last Step #13, with the first capacitance signal Ci1 or the second capacitance signal Ci2 obtained in the Step #13 before that.

The indicator position detecting portion 14 detects, as the position of the indicator that is in contact with or close to the detecting surface P, a position where a change in the capacitance (e.g., local decrease in the capacitance, the same shall apply hereinafter) that is the same as that when the indicator is in contact with or close to the detecting surface appears in both the first capacitance signal Ci1 and the second capacitance signal Ci2. The indicator position detecting portion 14 does not detect, as the position where the indicator is in contact with or close to the detecting surface P, a position where the change in the capacitance that is the same as that when the indicator is in contact with or close to the detecting surface appears in either one of the first capacitance signal Ci1 and the second capacitance signal Ci2.

As illustrated in FIGS. 3A and 3B, when there is one indicator, the position where the capacitance is similarly changed is only one position where the indicator is in contact with or close to the detecting surface (the contact region T in FIGS. 3A and 3B). On the other hand, when there are two indicators, two parallel noise regions N are generated each in the first driving mode and in the second driving mode. Therefore, the positions where the capacitance is similarly changed are four, which are the two positions in each of which the indicator is in contact with or close to the detecting surface and the two positions in each of which the noise regions N cross each other. However, the possibility that the noise appears on the same position at the place where the noise regions N cross each other is sufficiently low. Therefore, the indicator position detecting portion 14 can accurately detect the position of the indicator that is in contact with or close to the detecting surface P in distinction from the noise.

The indicator position detecting portion 14 generates the detection result signal Ti indicating the position of the indicator detected in Step #15, and outputs the resultant (Step #16). When the indicator is not detected in Step #15, the indicator position detecting portion 14 may generate and output the detection result signal Ti indicating that there is no indicator that is in contact with or close to the detecting surface P.

As described above, in the noise eliminating operation, the drive/sense changeover portion 13 makes a changeover between the first driving mode and the second driving mode, whereby the indicator position detecting portion 14 detects the position of the indicator.

A specific example of the result of detecting an indicator when the touch panel system 1 executes the noise eliminating operation will be described next with reference to FIGS. 6 to 8. FIGS. 6 to 8 are graphs illustrating the specific example of an in-plane distribution of a capacitance, when the noise eliminating operation is executed by the touch panel system illustrated in FIG. 1. The graphs in FIGS. 6 to 8 illustrate such that a capacitance of a region where no object is present on the detecting surface P is defined as a reference, and a region having a capacitance smaller than the reference capacitance projects upward in the graphs.

Figure 6A:
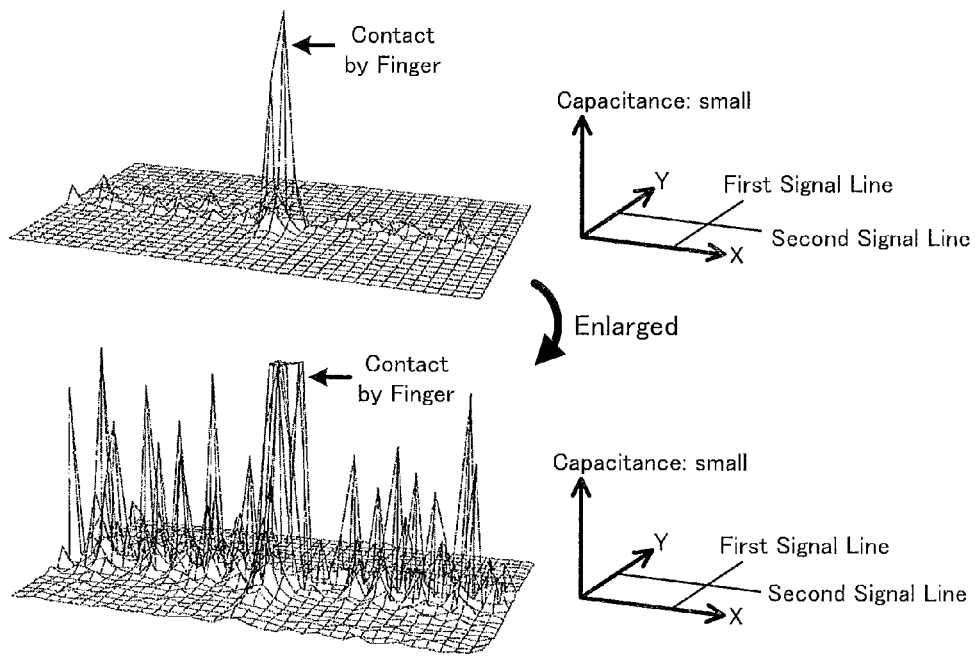
FIG. 6 is a graph illustrating a specific example of an in-plane distribution of a capacitance, when the noise eliminating operation is executed by the touch panel system illustrated in FIG. 1.
Figure 6B:
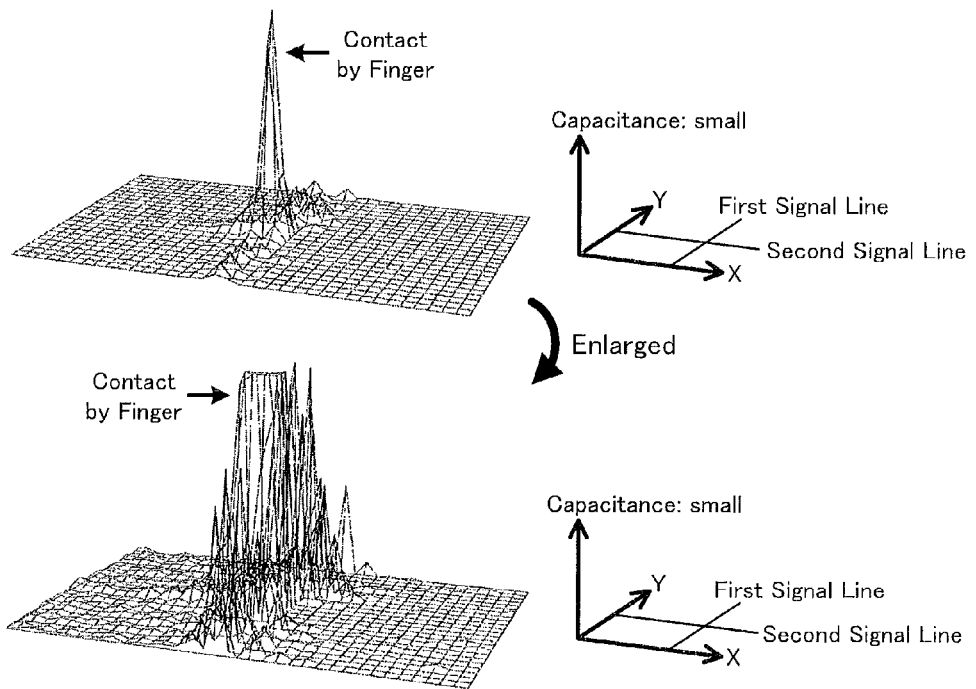

The graph in FIG. 6 illustrates that a finger is in contact with the detecting surface P. FIG. 6A is a graph illustrating the in-plane distribution of the capacitance in the first driving mode, while FIG. 6B is a graph illustrating the in-plane distribution of the capacitance in the second driving mode. The lower graph in FIG. 6A is the enlarged upper graph in FIG. 6A, while the lower graph in FIG. 6B is the enlarged upper graph in FIG. 6B.

As illustrated in FIGS. 6A and 6B, the decrease amount of the capacitance in the finger contact region locally increases. The position where the decrease amount locally increases is the same in the first driving mode and in the second driving mode. Therefore, the indicator position detecting portion 14 compares the first capacitance signal Ci1 with the second capacitance signal Ci2 so as to detect the position where the same change in the capacitance appears in the first driving mode and in the second driving mode, thereby being capable of detecting the position of the finger contact region as the position of the indicator.

Figure 7A:
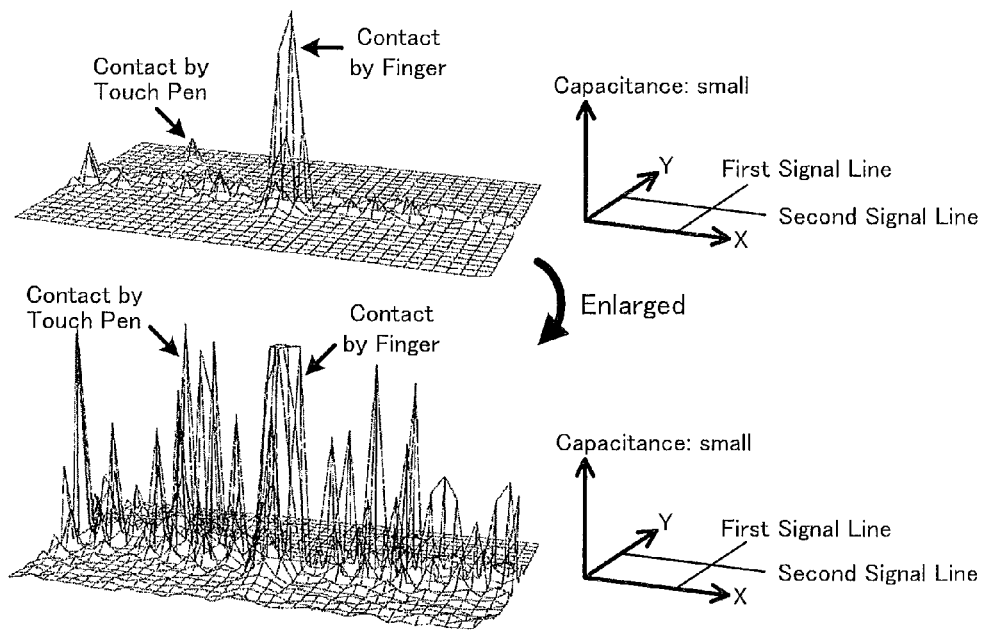
FIG. 7 is a graph illustrating a specific example of an in-plane distribution of a capacitance, when the noise eliminating operation is executed by the touch panel system illustrated in FIG. 1.
Figure 7B:
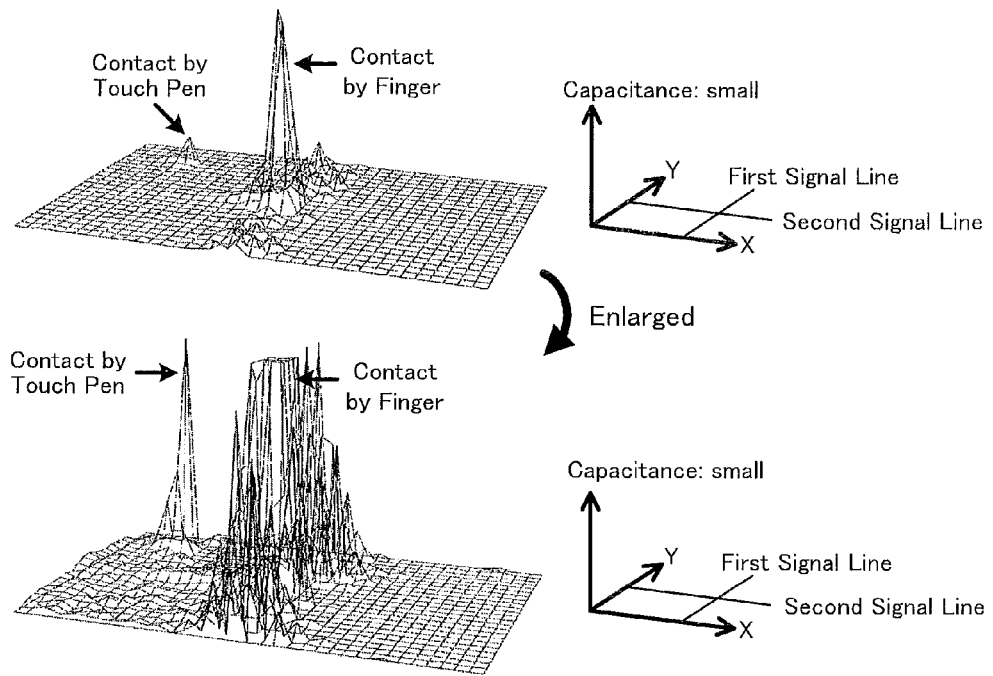

The graph in FIG. 7 illustrates that a finger and a touch pen are in contact with the detecting surface IP, wherein the contact region of the finger and the contact region of the touch pen are aligned neither in the X direction nor in the Y direction. FIG. 7A is a graph illustrating the in-plane distribution of the capacitance in the first driving mode, while FIG. 7B is a graph illustrating the in-plane distribution of the capacitance in the second driving mode. The lower graph in FIG. 7A is the enlarged upper graph in FIG. 7A, while the lower graph in FIG. 7B is the enlarged upper graph in FIG. 7B.

As illustrated in FIGS. 7A and 7B, the decrease amount of the capacitance in the finger contact region locally increases. The position where the decrease amount locally increases is the same in the first driving mode and in the second driving mode. Although the decrease amount is smaller than that in the finger contact region, the decrease amount in the capacitance in the contact region of the touch pen also locally increases. The position where the decrease amount locally increases is the same in the first driving mode and in the second driving mode. Therefore, the indicator position detecting portion 14 compares the first capacitance signal Ci1 with the second capacitance signal Ci2 so as to detect the position where the same change in the capacitance appears in the first driving mode and in the second driving mode, thereby being capable of detecting both the position of the finger contact region and the position of the touch-pen contact region as the positions of the indicators.

Figure 8A:
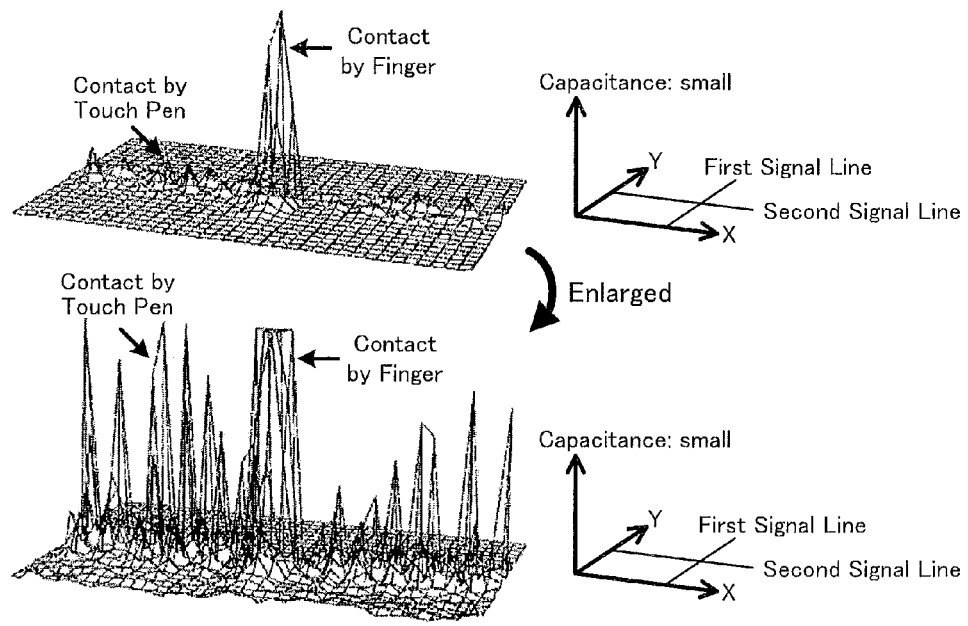
FIG. 8 is a graph illustrating a specific example of an in-plane distribution of a capacitance, when the noise eliminating operation is executed by the touch panel system illustrated in FIG. 1.
Figure 8B:
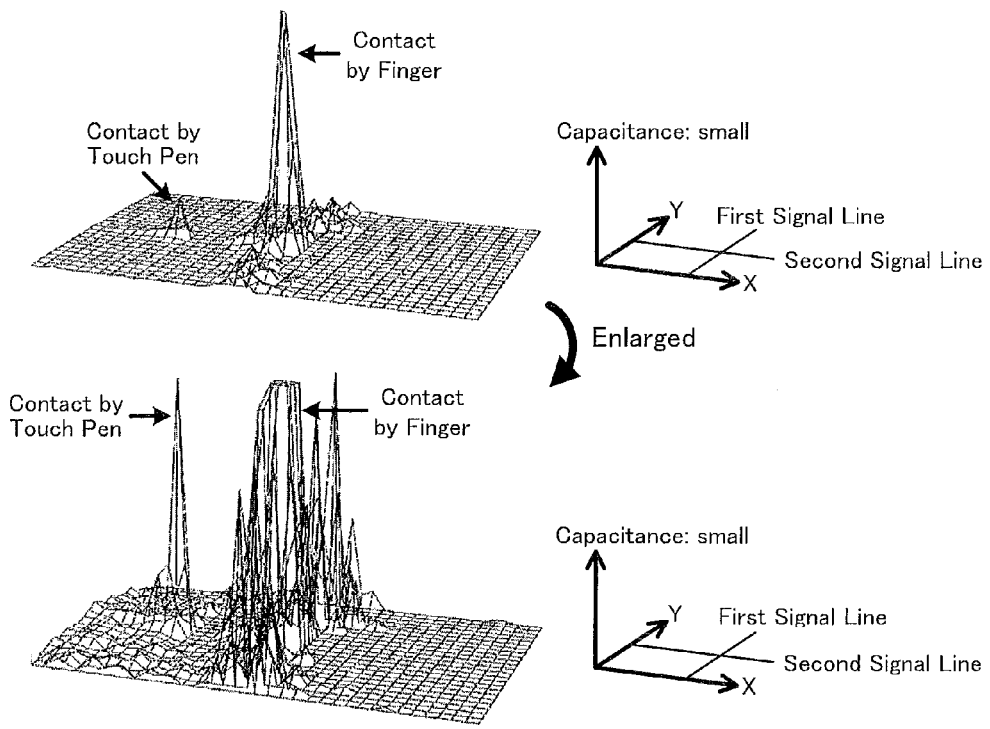

The graph in FIG. 8 illustrates that a finger and a touch pen are in contact with the detecting surface P, wherein the contact region of the finger and the contact region of the touch pen are aligned in the X direction. FIG. 8A is a graph illustrating the in-plane distribution of the capacitance in the first driving mode, while FIG. 8B is a graph illustrating the in-plane distribution of the capacitance in the second driving mode. The lower graph in FIG. 8A is the enlarged upper graph in FIG. 8A, while the lower graph in FIG. 8B is the enlarged upper graph in FIG. 8B.

As illustrated in FIGS. 8A and 8B, the decrease amount of the capacitance in the finger contact region locally increases. The position where the decrease amount locally increases is the same in the first driving mode and in the second driving mode. On the other hand, the decrease amount of the capacitance in the touch-pen contact region locally increases, but it is unnoticeable from the ambient noise in the first driving mode, since the noise caused by the contact of the finger to the detecting surface P is larger than the decrease amount. However, the position where the decrease amount in the capacitance on the touch-pen contact region locally increases is the same in the first driving mode and in the second driving mode. Therefore, the indicator position detecting portion 14 compares the first capacitance signal Ci1 with the second capacitance signal Ci2 so as to detect the position where the same change in the capacitance appears in the first driving mode and in the second driving mode, thereby being capable of detecting both the position of the finger contact region and the position of the touch-pen contact region as the positions of the indicators.

As described above, the touch panel system 1 according to the embodiment of the present invention compares the first capacitance signal Ci1 with the second capacitance signal Ci2, thereby being capable of distinguishing the indicator from the randomly-generated noise. Accordingly, the touch panel system 1 can accurately detect the position of the indicator in distinction from the noise.

Especially, the touch panel system 1 according to the embodiment of the present invention can accurately detect not only a position of an indicator (e.g., finger) having a large amount of change (decrease amount) in the capacitance caused by the indicator being close to or in contact with the detecting surface P but also a position of an indicator (e.g., touch pen) having a small amount of change (decrease amount) in the capacitance caused by the indicator being close to or in contact with the detecting surface P in distinction from noise.

<Electronic Information Device>

Figure 9:
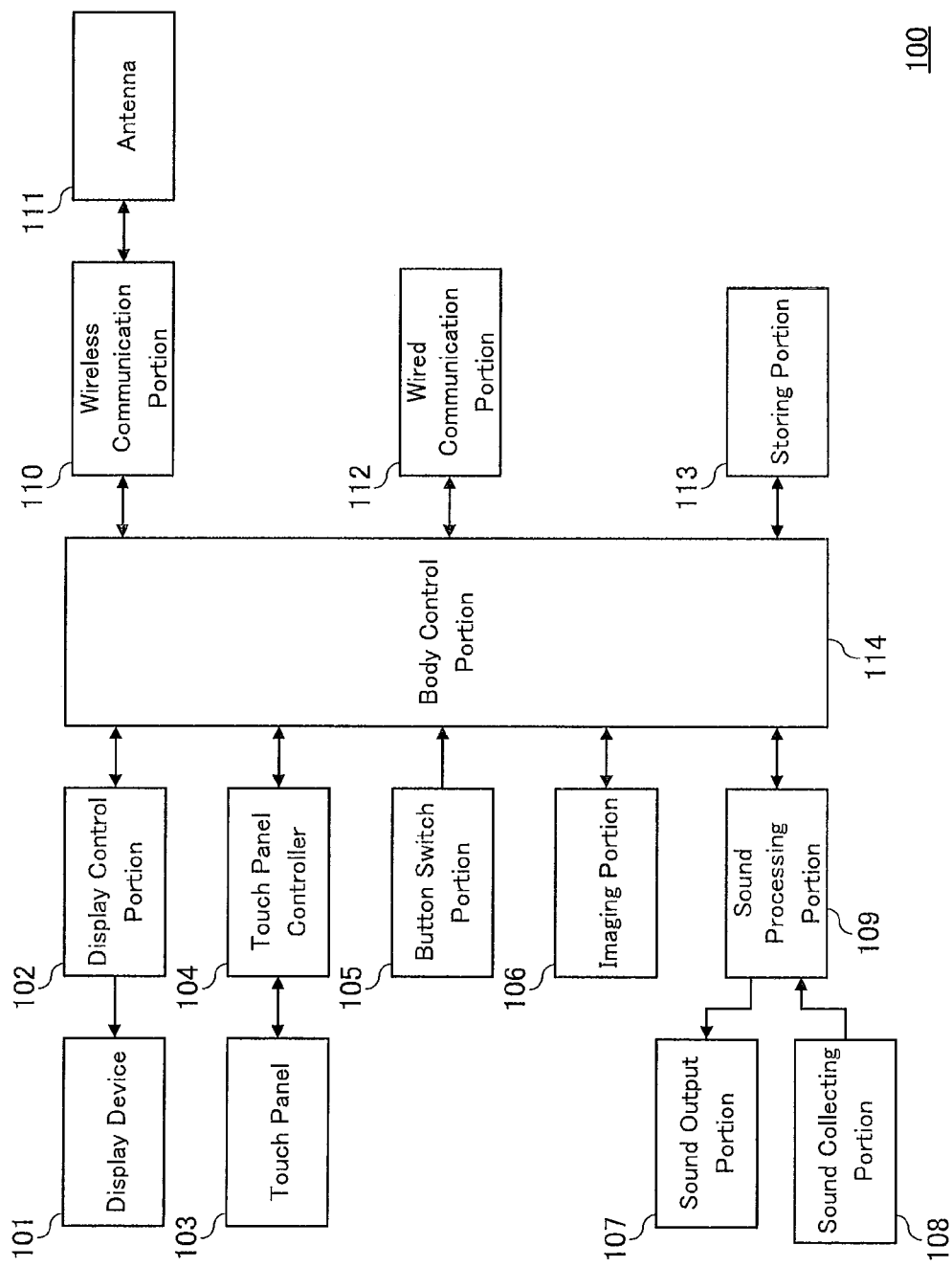
FIG. 9 is a block diagram illustrating an example of a configuration of an electronic information device according to the embodiment of the present invention.

An example of a configuration of an electronic information device provided with the touch panel system 1 according to the embodiment of the present invention will be described with reference to FIG. 9. FIG. 9 is a block diagram illustrating an example of a configuration of an electronic information device according to the embodiment of the present invention.

As illustrated in FIG. 9, the electronic information device 100 according to the embodiment of the present invention includes a display device 101, a display control portion 102 controlling the display device 101, a touch panel 103 corresponding to the above-mentioned touch panel 10, a touch panel controller 104 corresponding to the respective portions (driving portion 11, sense signal processing portion 12, drive/sense changeover portion 13, indicator position detecting portion 14, parameter storing portion 15, and operation control portion 16) excluding the touch panel 10 in the touch panel system 1, a button switch portion 105 that accepts a user's instruction when being depressed by a user, an imaging portion 106 that generates image data by capturing an image, a sound output portion 107 that receives sound data and outputs the sound data as a sound, a sound collecting portion 108 that generates sound data by collecting sound, a sound processing portion 109 that processes the sound data applied to the sound output portion 107 and processes the sound data applied from the sound collecting portion 108, a wireless communication portion 110 that wirelessly exchanges communication data with an external device of the electronic information device 100, an antenna 111 that emits the communication data wirelessly exchanged with the wireless communication portion 110 as an electromagnetic ray and receives the electromagnetic ray emitted from the external device of the electronic information device 100, a wired communication portion 112 that exchanges communication data with the external device of the electronic information device 100 in a wired manner, a storing portion 113 that stores various data, and a body control portion 114 that controls the entire operation of the electronic information device 100.

All of or a part of the indicator position detecting portion 14 and the operation control portion 16 may be formed as a part of the body control portion 114, not as a part of the touch panel controller 104. All of or a part of the parameter storing portion 15 may be formed as a part of the storing portion 113, not as a part of the touch panel controller 104.

The electronic information device 100 illustrated in FIG. 9 is only one application example of the touch panel system 1. The touch panel system 1 is applicable to an electronic information device having a configuration different from that of the electronic information device 100.

<Variations>

[1] In the above description, the indicator position detecting portion 14 detects an indicator by comparing the first capacitance signal Ci1 with the second capacitance signal Ci2 in Step #15 in FIG. 5. The position of the indicator may be detected by employing a method described below.

In this method, the indicator position detecting portion 14 firstly detects a position (hereinafter referred to as a first detection candidate position) on a region in the detecting surface P where the capacitance locally decreases based on the first capacitance signal Ci1, and detects a position (hereinafter referred to as a second detection candidate position) on a region in the detecting surface P where the capacitance locally decreases based on the second capacitance signal Ci2.

For example, the indicator position detecting portion 14 detects a region where a decrease amount of a capacitance is larger than a predetermined threshold value, and detects a position of centroid of this region as the first detection candidate position or the second detection candidate position. If a plurality of regions are detected, the position of the centroid may be detected for each region, and each of the detected positions of the centroid may be specified as the first detection candidate position or the second detection candidate position.

Figure 10:
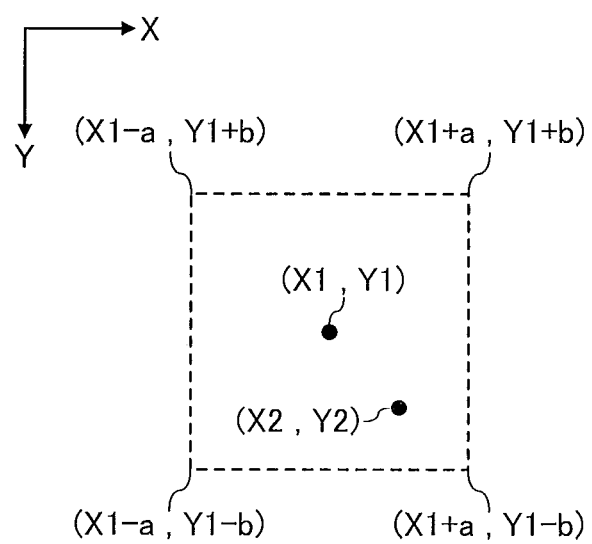
FIG. 10 is a view illustrating one example of a method of determining whether a first detection candidate position and a second detection candidate position agree with each other or not.

The indicator position detecting portion 14 compares the first detection candidate position with the second detection candidate position, and determines whether they agree with each other or not. One example of a method of determining whether the first detection candidate position and the second detection candidate position agree with each other or not by the indicator position detecting portion 14 will be described with reference to FIG. 10. FIG. 10 is a view illustrating one example of the method of determining whether the first detection candidate position and the second detection candidate position agree with each other or not. In FIG. 10, the first detection candidate position is represented as (X1, Y1), and the second detection candidate position is represented as (X2, Y2). Specifically, they are represented as coordinates in the X direction and in the Y direction.

As illustrated in FIG. 10, the indicator position detecting portion 14 sets a range having a predetermined size and having four corners, which are a corner of (X1−a, Y1+b), a corner of (X1−a, Y1−b), a corner of (X1+a, Y1−b), and a corner of (X1+a, Y1+b), as vertices (the rectangular range of 2a×2b with the first detection candidate position being defined as a center, indicated by a broken line in FIG. 10). In this case, the operation control portion 16 may control the indicator position detecting portion 14 by referring to the parameters indicating the "a" and "b" stored in the parameter storing portion 15, thereby allowing the indicator position detecting portion 14 to set this range.

As illustrated in FIG. 10, when the second detection candidate position (X2, Y2) is included in this range, the indicator position detecting portion 14 determines that the first detection candidate position (X1, Y1) and the second detection candidate position (X2, Y2) agree with each other. On the other hand, when the second detection candidate position (X2, Y2) is not included in this range, the indicator position detecting portion 14 determines that the first detection candidate position (X1, Y1) and the second detection candidate position (X2, Y2) do not agree with each other.

The indicator position detecting portion 14 recognizes that the first detection candidate position and the second detection candidate position, which are determined not to agree with each other, do not indicate the position of the indicator (recognizes the first detection candidate position and the second detection candidate position as being caused by noise), and excludes these positions.

On the other hand, the indicator position detecting portion 14 recognizes that the first detection candidate position and the second detection candidate position, which are determined to agree with each other, indicate the position of the indicator. The indicator position detecting portion 14 then detects the position of the indicator by using at least either one of the first detection candidate position and the second detection candidate position. Specifically, the indicator position detecting portion 14 may detect one of the first detection candidate position and the second detection candidate position as the position of the indicator. Alternatively, the indicator position detecting portion 14 may detect the position, which is detected by using both the first detection candidate position and the second detection candidate position (e.g., the mean position of the first detection candidate position and the second detection candidate position), as the position of the indicator.

As described above, the indicator position detecting portion 14 determines that the first detection candidate position and the second detection candidate position agree with each other, not only in the case where the first detection candidate position and the second detection candidate position exactly agree with each other, but also in the case where the first detection candidate position and the second detection candidate position are close to each other and are included in a range of a predetermined size. With this determination, it can be determined that the first detection candidate position and the second detection candidate position agree with each other even if the first detection candidate position and the second detection candidate position are slightly shifted from each other due to an error or the like. Therefore, the omission of detection of the indicator can be prevented. Accordingly, this operation is preferable.

It is preferable that the threshold value for detecting the first detection candidate position and the second detection candidate position is set to be smaller enough to detect all (or most of) indicators that are supposed to be used for the touch panel system 1. Specifically, for example, it is preferable that the threshold value is set to be smaller than the decrease amount of the capacitance when the touch pen is in contact with or close to the detecting surface P (see FIGS. 7, 8, and 12). When the noise eliminating operation is performed, even if the noise larger than the decrease amount of the capacitance caused by the touch pen being in contact with or close to the detecting surface P is generated, only the touch pen can be detected in distinction from the noise.

If the threshold value is set to be too small, many small noises might be detected as the first detection candidate position and the second detection candidate position, resulting in that the data storage amount and computation amount increase. Therefore, the threshold value is preferably set to be large to the extent possible. Specifically, as illustrated in FIGS. 7 and 8, when the finger and the touch pen are supposed to be used, a threshold value that is large to the extent possible to detect the touch pen is set. By virtue of this, only the noise larger than the decrease amount in the capacity caused by the touch pen is detected as the first detection candidate position and the second detection candidate position. Therefore, the data storage amount and the computation amount can be reduced.

The method of determining whether the first detection candidate position and the second detection candidate position agree with each other or not based on the situation in which the second detection candidate position is included within the range set with the first detection candidate position being set as the reference has been described with reference to FIG. 10. However, the determining method is not limited thereto. For example, a method described below may be employed. Specifically, the range same as that in FIG. 10 is set by using the first detection candidate position or the second detection candidate position detected from the first capacitance signal Ci1 or the second capacitance signal Ci2 obtained in the last Step #13 as a reference, regardless of the first detection candidate position and the second detection candidate position. Whether the first detection candidate position and the second detection candidate position agree with each other or not may be determined based on whether the first detection candidate position or the second detection candidate position detected from the first capacitance signal Ci1 or the second capacitance signal Ci2 obtained in the one before the last Step #13 are included or not in this range. Alternatively, for example, a method described below may be employed. Specifically, the range same as that in FIG. 10 is set by using the first detection candidate position or the second detection candidate position detected from the first capacitance signal Ci1 or the second capacitance signal Ci2 obtained in the one before the last Step #13 as a reference, regardless of the first detection candidate position and the second detection candidate position. Whether the first detection candidate position and the second detection candidate position agree with each other or not may be determined based on whether the first detection candidate position or the second detection candidate position detected from the first capacitance signal Ci1 or the second capacitance signal Ci2 obtained in the last Step #13 are included or not in this range.

[2] In the operation example illustrated in FIG. 5 (see the conceptual view in FIG. 13 for the operation), when it is the second and subsequent times to detect an indicator, every time the touch panel system 1 makes a changeover once between the first driving mode and the second driving mode, the first capacitance signal Ci1 is compared with the second capacitance signal Ci2 so as to detect the position of the indicator. However, the operation of the touch panel system 1 is not limited thereto. For example, every time the touch panel system 1 makes a changeover twice between the first driving mode and the second driving mode (i.e., every time the touch panel system 1 executes the first driving mode once and the second driving mode once), the touch panel system 1 may compare the first capacitance signal Ci1 with the second capacitance signal Ci2 so as to detect the position of the indicator (see the conceptual view in FIG. 14 for this operation).

Figure 15:
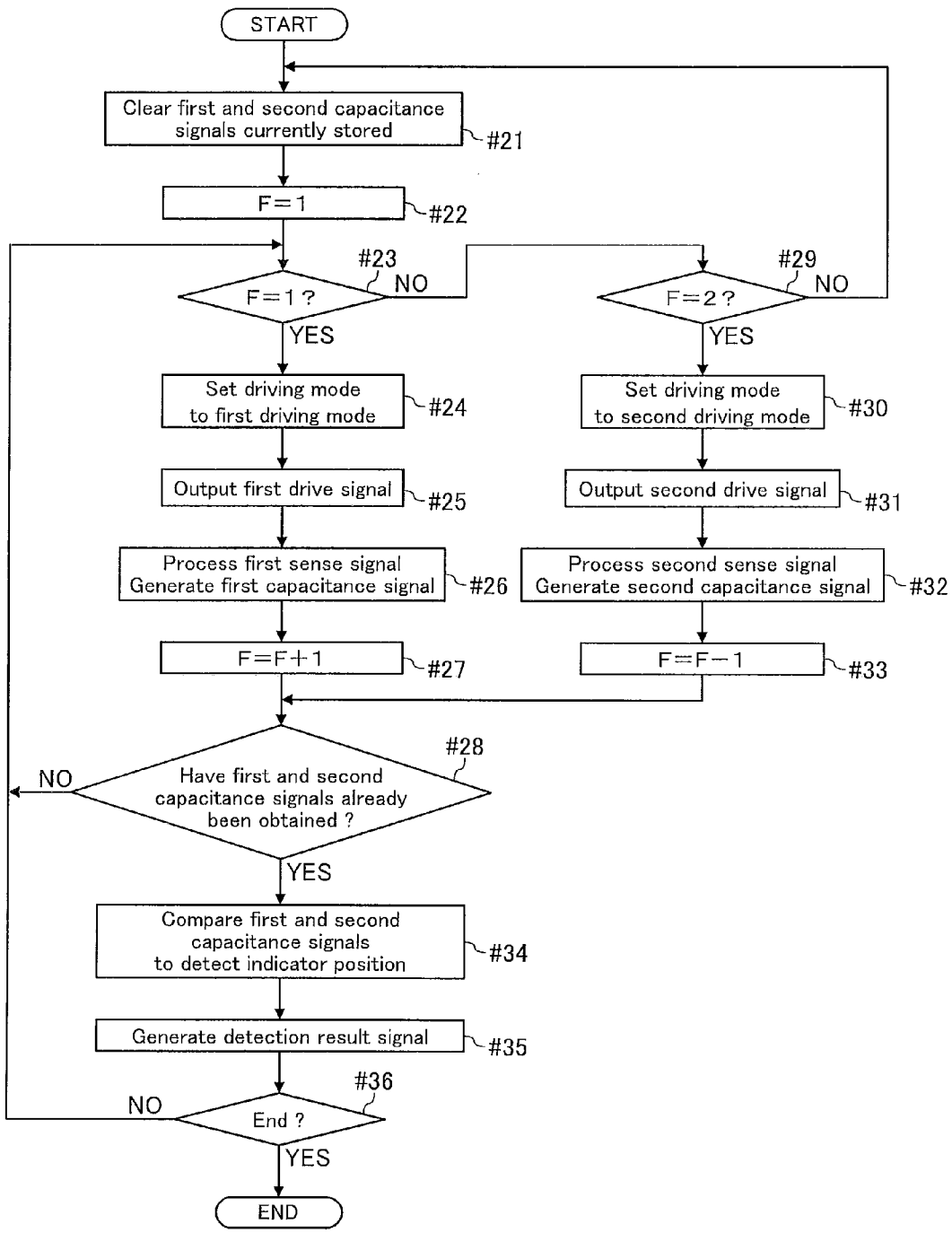
FIG. 15 is a flowchart illustrating an example of an operation for realizing the operation in FIG. 13.

A specific example of realizing the operation illustrated in the conceptual view in FIG. 13 will be described with reference to FIG. 15. FIG. 15 is a flowchart illustrating an example of the operation for realizing the operation in FIG. 13. The operation illustrated in FIG. 15 corresponds to one specific example in the operation example illustrated in FIG. 5. The operation example illustrated in FIG. 5 is the operation when the indicator is detected once, and this operation is repeatedly executed. The operation example in FIG. 15 includes the repeated operation, and this is the operation by which the indicator can be detected a plurality of times.

In the operation example in FIG. 15, the touch panel system 1 firstly makes initialization. Specifically, the indicator position detecting portion 14 clears the first capacitance signal and the second capacitance signal currently stored, for example (Step #21). The operation control portion 16 sets a flag F to 1 (Step #22). The value of 1 that is the value of the flag F set in Step #22 corresponds to a parameter indicating the driving mode for the initialization described in FIG. 5. In the description below, it is supposed that the initialized value of the flag F is 1. However, as described in the operation example in FIG. 5, the initialized value of the flag F may be 2.

When the operation control portion 16 confirms that the flag F is 1 (Step #23, YES), the operation control portion 16 then inputs the changeover control signal Ei for changing the driving mode to the first driving mode into the drive/sense changeover portion 13, thereby setting the driving mode to the first driving mode (Step #24). The driving portion 11 then outputs the first drive signal Di1 (Step #25), and the sense signal processing portion 12 processes the first sense signal Si1, whereby the first capacitance signal Ci1 is generated (Step #26).

Next, the operation control portion 16 increments the flag F (Step #27). Thus, the value of the flag F becomes 2.

When the first capacitance signal Ci1 and the second capacitance signal Ci2 have not yet been obtained (Step #28, NO), the touch panel system 1 returns to Step #23. The case where the first capacitance signal Ci1 and the second capacitance signal Ci2 have not yet been obtained at this point means that it is the first time to detect an indicator, and only the first capacitance signal Ci1 is generated (the processes in Steps #25 and #26 are only executed). When the later-described second capacitance signal Ci2 is generated (the processes in Steps #31 and #32 are executed) even if it is the first time to detect an indicator, or when it is the second or subsequent times to detect the indicator, the first capacitance signal Ci1 and the second capacitance signal Ci2 have been obtained at this point.

When confirming that the flag F is not 1 (Step #23, NO), but 2 (Step #29, YES), the operation control portion 16 inputs the changeover control signal Ei for changing the mode to the second driving mode into the drive/sense changeover portion 13, thereby setting the driving mode to the second driving mode (Step #30). The driving portion 11 then outputs the second drive signal Di2 (Step #31), and the sense signal processing portion 12 processes the second sense signal Si2, whereby the second capacitance signal Ci2 is generated (Step #32). When the operation control portion 16 confirms that the flag F is neither 1 nor 2 (Steps #23 and #29, NO), it executes initialization (Steps #21 and #22), since this situation is abnormal.

The operation control portion 16 then decrements the flag F (Step #33). Thus, the value of the flag F becomes 1.

When the first capacitance signal Ci1 and the second capacitance signal Ci2 have already been obtained (Step #28, YES), the indicator position detecting portion 14 detects the position of the indicator by comparing the first capacitance signal Ci1 with the second capacitance signal Ci2 (Step #34). In this case, the indicator position detecting portion 14 compares the first capacitance signal Ci1 obtained in the last Step #26 with the second capacitance signal Ci2 obtained in the last Step #32. In other words, the indicator position detecting portion 14 compares the first capacitance signal Ci1 with the second capacitance signal Ci2 obtained just before and just after the changeover (Step #30) between the first driving mode and the second driving mode.

The indicator position detecting portion 14 detects, as the position where the indicator is in contact with or close to the detecting surface P, a position where the change in the capacitance that is the same as that when the indicator is in contact with or close to the detecting surface appears in both of the first capacitance signal Ci1 and the second capacitance signal Ci2. On the other hand, the indicator position detecting portion 14 does not detect, as the position where the indicator is in contact with or close to the detecting surface P, a position where the change in the capacitance that is the same as that when the indicator is in contact with or close to the detecting surface appears in either one of the first capacitance signal Ci1 and the second capacitance signal Ci2.

Then, the indicator position detecting portion 14 generates the detection result signal Ti indicating the position of the indicator detected in Step #34, and outputs the resultant (Step #35). When the indicator is not detected in Step #35, the indicator position detecting portion 14 may generate and output the detection result signal Ti indicating that there is no indicator that is in contact with or close to the detecting surface P.

If the touch panel 1 ends the operation (Step #36, YES), the operation is ended. On the other hand, if the touch panel 1 does not end the operation (Step #36, NO), the touch panel 1 returns to Step #23 where the operation control portion 16 confirms the value of the flag F.

If the flag F is 1 (Step #23, YES) when the touch panel system 1 returns from Step #36 to Step #23, the driving mode is set to the first driving mode, wherein the first capacitance signal Ci1 is generated (Steps #24 to #26), and the flag F is incremented to become 2 (Step #27). In this case, since the second capacitance signal Ci2 has already been obtained in Step #32 before the touch panel system 1 returns to Step #23, the first capacitance signal Ci1 and the second capacitance signal Ci2 have already been obtained (Step #28, YES).

Accordingly, the indicator position detecting portion 14 compares the first capacitance signal Ci1 obtained in the last Step #26 with the second capacitance signal Ci2 obtained in the last Step #32, thereby detecting the position of the indicator (Step #34). Thereafter, the indicator position detecting portion 14 generates and outputs the detection result signal Ti (Step #35). In other words, the indicator position detecting portion 14 compares the first capacitance signal Ci1 with the second capacitance signal Ci2 obtained just before and just after the changeover (Step #24) between the first driving mode and the second driving mode, thereby detecting the position of the indicator (Step #34). Thereafter, the indicator position detecting portion 14 generates and outputs the detection result signal Ti (Step #35).

On the other hand, if the flag F is 2 (Step #23, NO, and Step #29, YES) when the touch panel system 1 returns from Step #36 to Step #23, the driving mode is set to the second driving mode, wherein the second capacitance signal Ci2 is generated (Steps #30 to #32), and the flag F is decremented to become 1 (Step #33). In this case, since the first capacitance signal Ci1 is obtained in Step #26 before the touch panel system 1 returns to Step #23, the first capacitance signal Ci1 and the second capacitance signal Ci2 have already been obtained (Step #28, YES).

Accordingly, the indicator position detecting portion 14 compares the first capacitance signal Ci1 obtained in the last Step #26 with the second capacitance signal Ci2 obtained in the last Step #32, thereby detecting the position of the indicator (Step #34). Thereafter, the indicator position detecting portion 14 generates and outputs the detection result signal Ti (Step #35). In other words, the indicator position detecting portion 14 compares the first capacitance signal Ci1 with the second capacitance signal Ci2 obtained just before and just after the changeover (Step #30) between the first driving mode and the second driving mode, thereby detecting the position of the indicator (Step #34). Thereafter, the indicator position detecting portion 14 generates and outputs the detection result signal Ti (Step #35).

Figure 13:
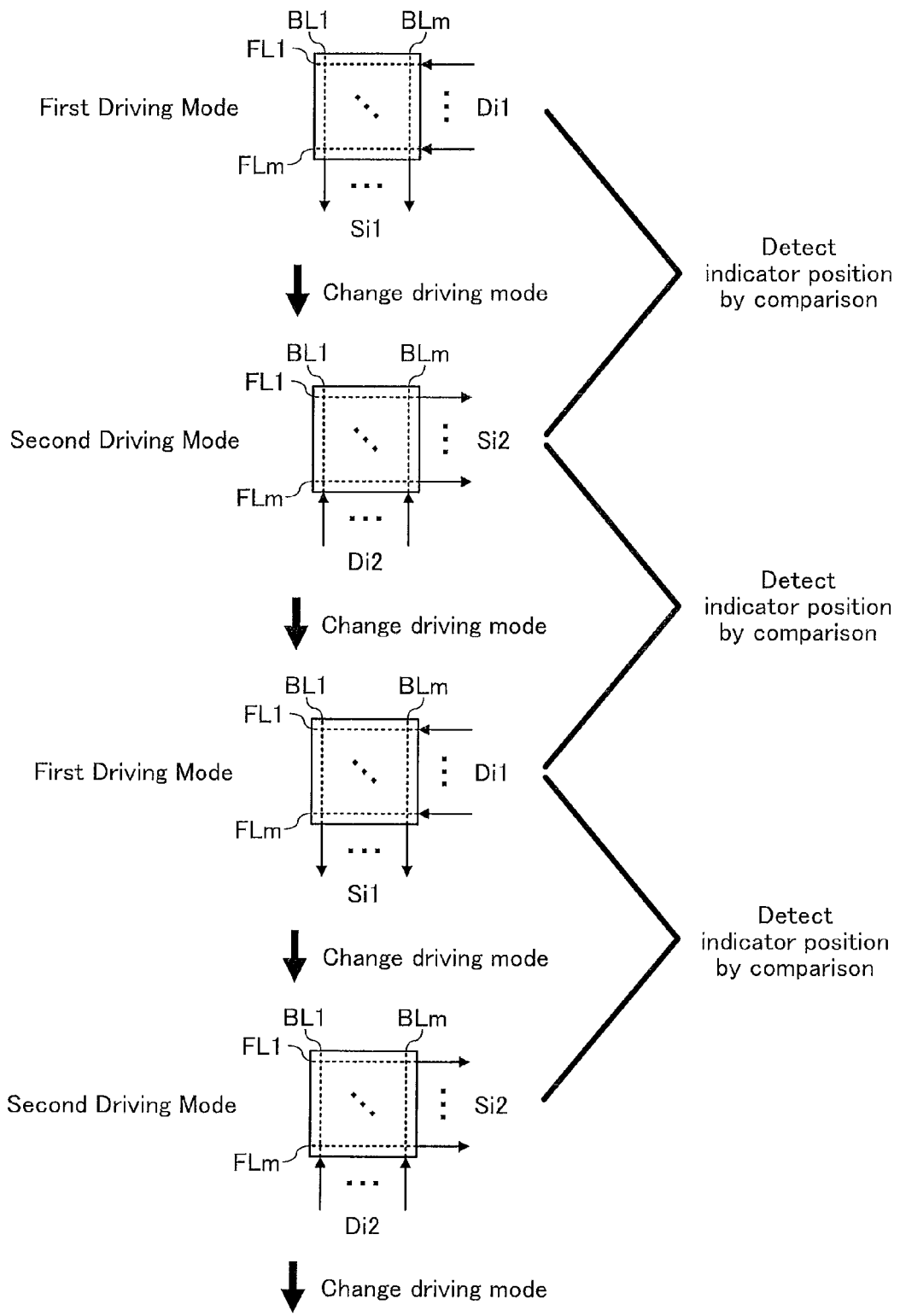
FIG. 13 is a conceptual view illustrating the operation illustrated in FIG. 5.
Figure 14:
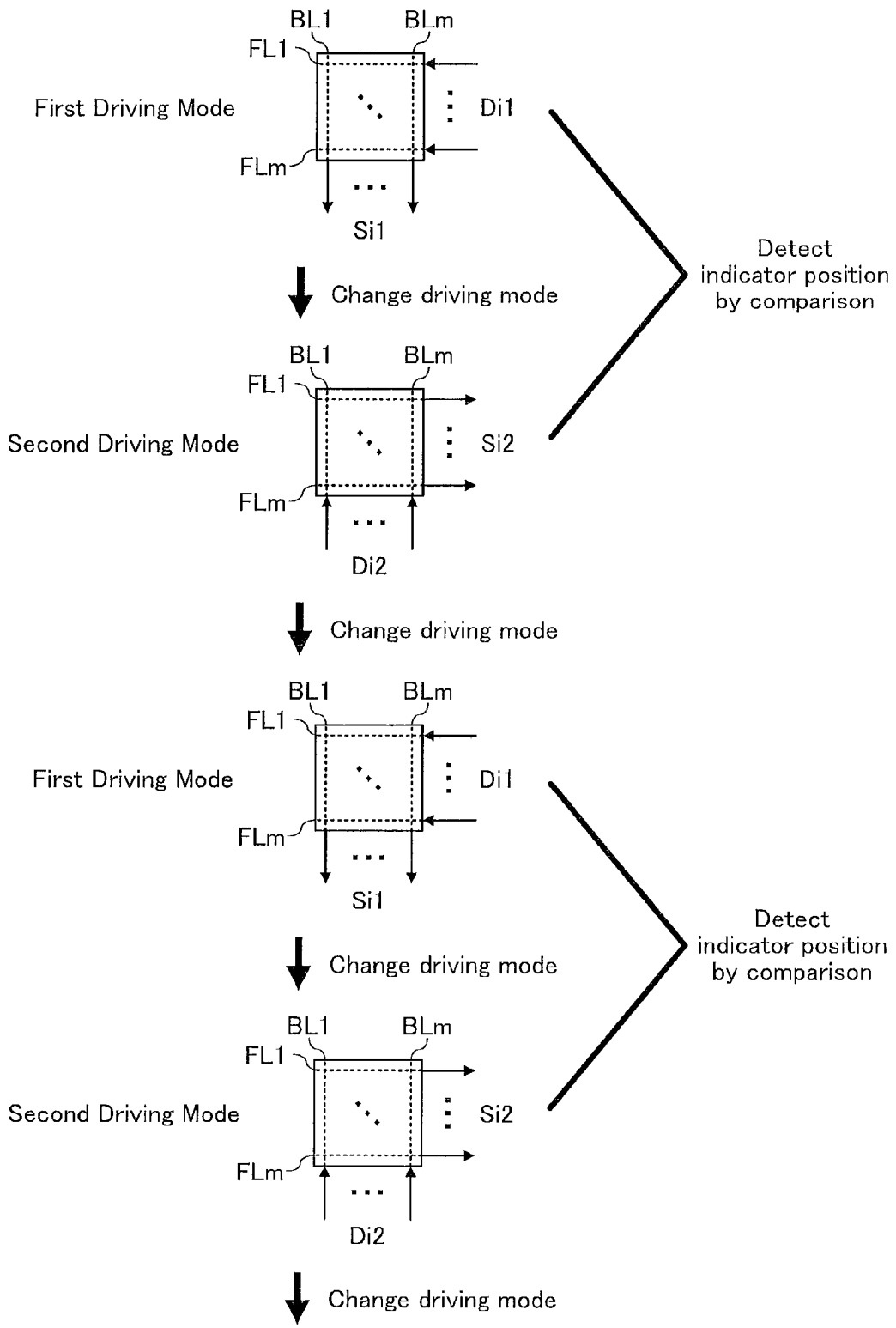
FIG. 14 is a conceptual view illustrating an operation different from the operation in FIG. 5.

In the operation in FIG. 13 (in the operation example illustrated in FIGS. 5 and 15), a position of an indicator is detected, every time the first capacitance signal Ci1 and the second capacitance signal Ci2 are obtained. Therefore, compared to the operation in FIG. 14 where a position of an indicator is detected every time a predetermined one of the first capacitance signal Ci1 and the second capacitance signal Ci2 is obtained, the number of times of detecting the indicator can be increased (doubled), and the time interval of detecting the indicator can be decreased (reduced to half). Accordingly, time resolution of detecting an indicator can be enhanced without increasing an operation speed (frame rate) of the touch panel system 1, whereby the accuracy of detecting the position of the indicator can be enhanced, according to the operation in FIG. 13.

[3] In Step #3 in FIG. 4, the indicator position detecting portion 14 may detect a region where the decrease amount of the capacitance is larger than a certain predetermined threshold value, and may detect a centroid position of this region as the position of the indicator. It is preferable that the threshold value is set according to the purpose of the touch panel system 1 and the electronic information device 100 provided with the touch panel system 1. Specifically, when it is necessary that the erroneous recognition in which the noise is erroneously recognized as the indicator is prevented as much as possible, the threshold value may be set larger. When it is necessary to detect positions of various indicators, the threshold value may be set smaller. If the threshold value is set larger, an indicator having a small change (decrease amount) in the capacitance due to the indicator such as a touch pen being in contact with or close to the detecting surface P is difficult to be detected. On the other hand, if the threshold value is set smaller, noise is liable to be erroneously recognized as an indicator.

[4] The embodiment of the present invention describes the touch panel system 1 having the first signal lines FL1 to FLm and the second signal lines BL1 to BLm in the same number. However, the number of the first signal lines and the number of the second signal lines may be different from each other as described above. In this case, in each of the first driving mode and the second driving mode, the number of the first drive signals Di1 and the number of the second drive signals Di2 outputted by the driving portion 11 are different from each other, and the number of the first sense signals Si1 and the number of the second sense signals Si2 processed by the sense signal processing portion 12 are different from each other.

When the number of the first signal lines is p (p is a natural number of 2 or more), and the number of the second signal lines is q (q is a natural number larger than p), it is only necessary that the drive/sense changeover portion 13 includes p connection changeover portions 131 same as those illustrated in FIG. 2, and (q-p) connection changeover portions that do not include the CMOS switches SW1 and SW2 but include the CMOS switches SW3 and SW4. On the contrary, when the number of the first signal lines is q, and the number of the second signal lines is p, it is only necessary that the drive/sense changeover portion 13 includes p connection changeover portions 131 same as those illustrated in FIG. 2, and (q-p) connection changeover portions that do not include the CMOS switches SW3 and SW4 but include the CMOS switches SW1 and SW2.

[5] The above-mentioned embodiment describes that the changeover between the first driving mode and the second driving mode is executed, every time the first signal lines FL1 to FLm or the second signal lines BL1 to BLm are driven once. However, the changeover may be made by a method other than the above-mentioned method. For example, the changeover between the first driving mode and the second driving mode may be executed, every time the first signal lines FL1 to FLm or the second signal lines BL1 to BLm are driven a plurality of times (e.g., three times). In this case, the indicator position detecting portion 14 may compare the average of the first capacitance signals Ci1 obtained a plurality of times in the first driving mode with the average of the second capacitance signals Ci2 obtained a plurality of times in the second driving mode.

The specific example of this operation will be described with reference to FIG. 16. FIG. 16 is a conceptual view illustrating another example of the operation in the touch panel system according to the embodiment of the present invention.

Figure 16A:
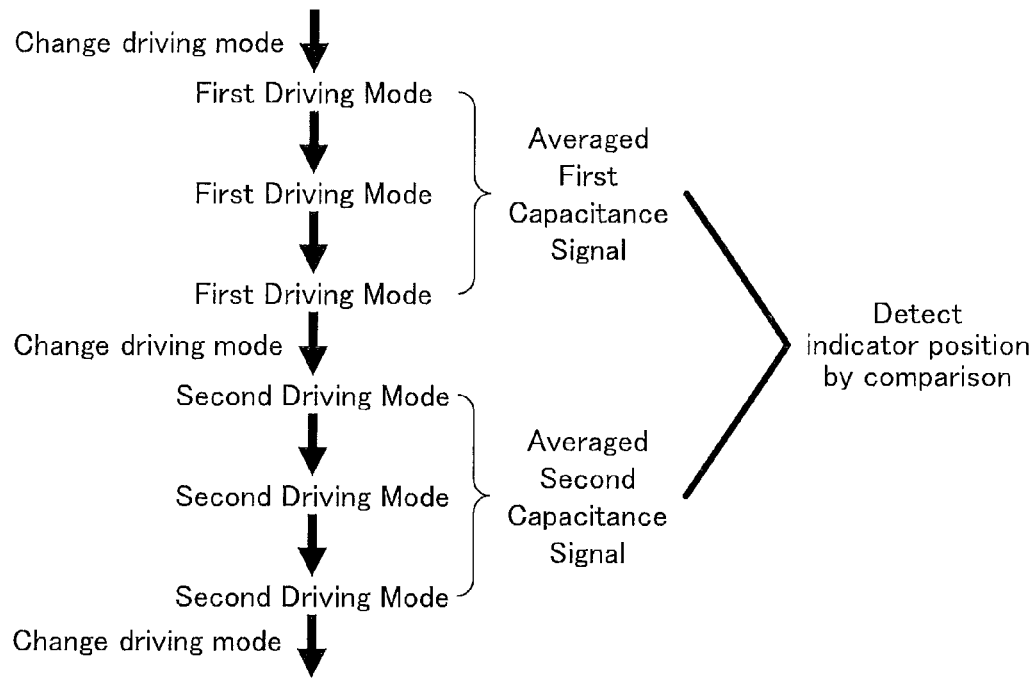
FIG. 16 is a conceptual view illustrating an example of another operation of the touch panel system according to the embodiment of the present invention.

In the operation example in FIG. 16A, the drive/sense changeover portion 13 makes the changeover of the driving mode such that the driving portion 11 and the sense signal processing portion 12 are continuously operated three times in the first driving mode, and the driving portion 11 and the sense signal processing portion 12 are continuously operated three times in the second driving mode. In this case, the first capacitance signal Ci1 is obtained three times in a row, and the second capacitance signal Ci1 is obtained three times in a row.

In the operation example in FIG. 16A, the indicator position detecting portion 14 averages the first capacitance signals Ci1 obtained in a row, and averages the second capacitance signals Ci2 obtained in a row. The indicator position detecting portion 14 detects the position of the indicator by comparing the averaged first capacitance signal Ci1 with the averaged second capacitance signal Ci2, as in the above-mentioned operation example of the touch panel system 1.

The position of a noise component in each of the first capacitance signal Ci1 and the second capacitance signal Ci2 can randomly be varied, even in a short period when the first capacitance signal Ci1 or the second capacitance signal Ci2 is generated a plurality of times in a row. However, the position of the indicator component in each of the first capacitance signal Ci1 and the second capacitance signal Ci2 hardly varies in such a short period. Accordingly, when the indicator position detecting portion 14 averages the first capacitance signal Ci1 and the second capacitance signal Ci2 respectively, the indicator position detecting portion 14 can selectively eliminate (reduce) the noise component without giving an influence to the indicator component. Even if the position of the indicator component in each of the first capacitance signal Ci1 and the second capacitance signal Ci2 is slightly shifted from the real position of the indicator due to jitter, the influence caused by such a shift can be suppressed by the averaging process. Accordingly, the accuracy in detecting the position of the indicator can be enhanced.

In the operation example in FIG. 16A, the number of the first capacitance signals Ci1 obtained in a row and the number of the second capacitance signals Ci2 obtained in a row are equal to each other (3). However, they may be different from each other as in an operation example illustrated in FIG. 16B.

When the number of the first signal lines and the number of the second signal lines are different from each other, in particular, the number of the first sense signals Si1 generated in the first driving mode and the number of the second sense signals Si2 generated in the second driving mode are different from each other. Therefore, there is a difference between the time taken for the sense signal processing portion 12 to process the first sense signals Si1 so as to generate the first capacitance signals Ci1, and the time taken for the sense signal processing portion 12 to process the second sense signals Si2 so as to generate the second capacitance signals Ci2.

Specifically, when the number (e.g., 100) of the first signal lines is larger than the number (e.g., 50) of the second signal lines, the time taken for the sense signal processing portion 12 to generate one second capacitance signal Ci2 can be longer than the time taken for the signal processing portion 12 to generate one first capacitance signal Ci1.

In this example, it is preferable that the number (2 in the example in FIG. 16B) of the second capacitance signals obtained in a row is not more than the number (3 in the example in FIG. 16B) of the first capacitance signals obtained in a row. In this case, since each of the first capacitance signals Ci1 is generated in a relatively short time, the number of the first capacitance signals Ci1 generated in a row is increased to enhance the effect of the averaging process. On the other hand, since it takes a relatively long time to generate each of the second capacitance signals Ci2, the number of the second capacitance signals Ci2 generated in a row is decreased to shorten the processing time. Consequently, the accuracy in detecting the position of the indicator can be enhanced, and the processing time can be shortened.

Figure 16B:
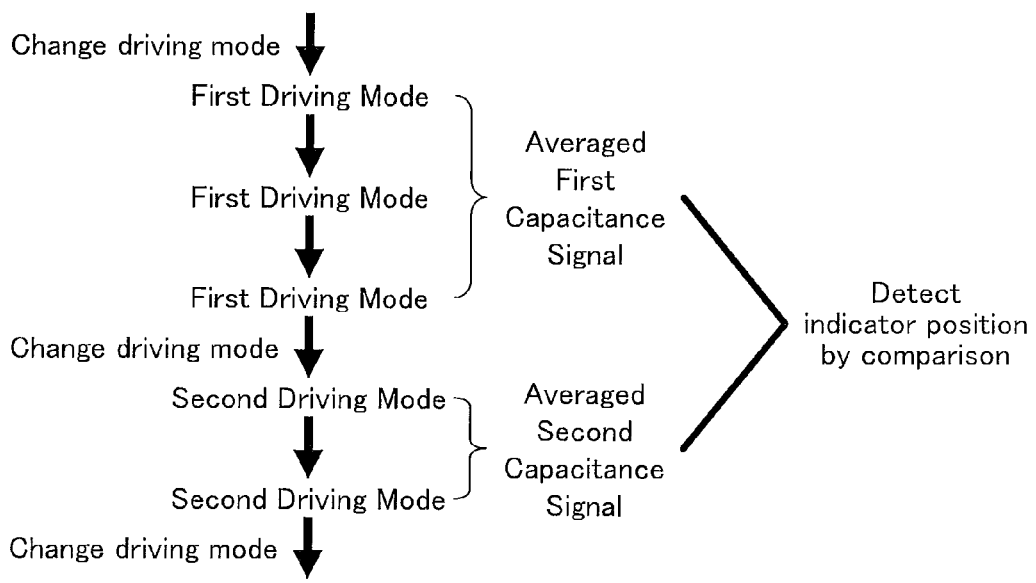

The operation example in FIG. 13 may be combined to the operation examples in FIGS. 16A and 16B. Specifically, every time the drive/sense changeover portion 13 makes a changeover between the first driving mode and the second driving mode, the indicator position detecting portion 14 may detect the position of the indicator by using (the average of) the first capacitance signals Ci1 obtained in a row and (the average of) the second capacitance signals Ci2 obtained in a row just before and just after the changeover. It is not always necessary that both the first capacitance signal Ci1 and the second capacitance signal Ci2 are generated a plurality of times in a row. The above-mentioned effect can be obtained as long as either one of them is generated a plurality of times in a row.

The touch panel system according to the present invention is well adaptable to a touch panel system provided with a projection type touch panel using an electrostatic capacitance system, and an electronic information device provided with the touch panel system.

What is claimed is:

1. A touch panel system comprising:
    a touch panel including a plurality of first signal lines provided along a detecting surface so as to be parallel to each other, and a plurality of second signal lines provided along the detecting surface so as to be parallel to each other, the second signal lines crossing the first signal lines;
    a driving portion configured to apply a first drive signal to the first signal lines for driving the same in a first driving mode, and to apply a second drive signal to the second signal lines for driving the same in a second driving mode;
    a sense signal processing portion configured to generate a first capacitance signal indicating an in-plane distribution of a change in a capacitance formed by the first signal lines and the second signal lines, based on a first sense signal appearing on the second signal lines in the first driving mode, and to generate a second capacitance signal indicating an in-plane distribution of a change in a capacitance formed by the first signal lines and the second signal lines, based on a second sense signal appearing on the first signal lines in the second driving mode;
    a drive/sense changeover portion configured to make a changeover between the first driving mode and the second driving mode; and
    an indicator position detecting portion configured to detect a position of an indicator, which is in contact with or close to the detecting surface, based on at least either one of the first capacitance signal and the second capacitance signal,
    wherein the indicator position detecting portion detects the position of the indicator, which is in contact with or close to the detecting surface, by comparing the first capacitance signal with the second capacitance signal
    wherein every time the drive/sense changeover portion makes the changeover between the first driving mode and the second driving mode, the indicator position detecting portion detects the position of the indicator, which is in contact with or close to the detecting surface, by using at least one first capacitance signal and at least one second capacitance signal obtained just before and just after the changeover.

2. The touch panel system according to claim 1, wherein the indicator position detecting portion detects, as the position of the indicator that is in contact with or close to the detecting surface, a position where a change in the capacitance that is the same as that when the indicator is in contact with or close to the detecting surface appears in both the first capacitance signal and the second capacitance signal.

3. The touch panel system according to claim 2, wherein the indicator position detecting portion detects the position of the indicator that is in contact with or close to the detecting surface based on: a situation in which the first capacitance signal includes a first noise generated along the second signal lines passing through the position where the indicator is in contact with or close to the detecting surface; and a situation in which the second capacitance signal includes a second noise generated along the first signal lines passing through the position where the indicator is in contact with or close to the detecting surface.

4. The touch panel system according to claim 3, wherein the indicator position detecting portion is configured not to detect a position where a change in the capacitance that is the same as that when the indicator is in contact with or close to the detecting surface appears in only either one of the first capacitance signal and the second capacitance signal, as the position of the indicator that is in contact with or close to the detecting surface.

5. The touch panel system according to claim 3, wherein at least a first indicator and a second indicator are used as the indicator, and the magnitude of the first noise or the second noise generated when the first indicator is in contact with or close to the detecting surface is not less than the amount of change of the capacitance when the second indicator is in contact with or close to the detecting surface.

6. The touch panel system according to claim 1, wherein when the indicator position detecting portion determines that a first detection candidate position detected based on the first capacitance signal and a second detection candidate position detected based on the second capacitance signal agree with each other, the indicator position detecting portion detects the position of the indicator by using at least either one of the first detection candidate position and the second detection candidate position.

7. The touch panel system according to claim 6, wherein the indicator position detecting portion is configured not to use the first detection candidate position and the second detection candidate position, which are determined not to agree with each other, for the detection of the position of the indicator.

8. The touch panel system according to claim 6, wherein the indicator position detecting portion determines that the first detection candidate position and the second detection candidate position agree with each other not only in case where the first detection candidate position and the second detection candidate position exactly agree with each other, but also in case where the first detection candidate position and the second detection candidate position are close to each other and are included within a range with a predetermined size.

9. The touch panel system according to claim 1,
    wherein the drive/sense changeover portion makes the changeover between the first driving mode and the second driving mode in order that at least one of the first capacitance signal and the second capacitance signal is obtained a plurality of times in a row; and
    the indicator position detecting portion uses a first capacitance signal, which is obtained by averaging the first capacitance signals obtained a plurality of times in a row, upon detecting the position of the indicator that is in contact with or close to the detecting surface, when the first capacitance signal is obtained a plurality of times in a row, and uses a second capacitance signal, which is obtained by averaging the second capacitance signals obtained a plurality of times in a row, upon detecting the position of the indicator that is in contact with or close to the detecting surface, when the second capacitance signal is obtained a plurality of times in a row.

10. The touch panel system according to claim 9, wherein when the number of the first signal lines is larger than the number of the second signal lines, the number of the second capacitance signals obtained in a row is not more than the number of the first capacitance signals obtained in a row.

11. The touch panel system according to claim 1, wherein the drive/sense changeover portion selectively executes one of a noise eliminating operation in which the changeover between the first driving mode and the second driving mode is performed, and a normal operation in which one of the first driving mode and the second driving mode is continued.

12. An electronic information device comprising:
the touch panel system according to claim 1; and
a display device.

13. A method for detecting a position of an indicator that is in contact with or close to a detecting surface by using a touch panel including a plurality of first signal lines provided along the detecting surface so as to be parallel to each other, and a plurality of second signal lines provided along the detecting surface so as to be parallel to each other, the second signal lines crossing the first signal lines, the method comprising:
a first driving mode executing step of applying a first drive signal to the first signal lines for driving the same, and acquiring and processing a first sense signal appearing on the second signal lines, in order to generate a first capacitance signal indicating an in-plane distribution of a change in a capacitance formed by the first signal lines and the second signal lines;
a second driving mode executing step of applying a second drive signal to the second signal lines for driving the same, and acquiring and processing a second sense signal appearing on the first signal lines, in order to generate a second capacitance signal indicating an in-plane distribution of a change in a capacitance formed by the first signal lines and the second signal lines; and
an indicator position detecting step of detecting the position of the indicator, which is in contact with or close to the detecting surface, through a comparison between the first capacitance signal and the second capacitance signal,
wherein every time a changeover is made between the first driving mode and the second driving mode, the position of the indicator, which is in contact with or close to the detecting surface is detected by using at least one first capacitance signal and at least one second capacitance signal obtained just before and just after the changeover, at the indicator position detecting step.

14. The method according to claim 13, wherein an intensity of the first drive signal and an intensity of the second drive signal are set to be equal to each other.

* * * * *